US011958202B2

(12) United States Patent
Ye et al.

(10) Patent No.: US 11,958,202 B2
(45) Date of Patent: Apr. 16, 2024

(54) METHOD AND COMPUTING SYSTEM FOR PERFORMING CONTAINER DETECTION AND OBJECT DETECTION

(71) Applicant: MUJIN, INC., Tokyo (JP)

(72) Inventors: Xutao Ye, Tokyo (JP); Kazuto Murase, Tokyo (JP)

(73) Assignee: MUJIN, INC., Tokyo (JP)

( * ) Notice: Subject to any disclaimer, the term of this patent is extended or adjusted under 35 U.S.C. 154(b) by 0 days.

(21) Appl. No.: 17/400,361

(22) Filed: Aug. 12, 2021

(65) Prior Publication Data

US 2021/0370518 A1 Dec. 2, 2021

Related U.S. Application Data

(63) Continuation of application No. 16/929,854, filed on Jul. 15, 2020, now Pat. No. 11,130,237.

(Continued)

(51) Int. Cl.
*B25J 9/16* (2006.01)
*B25J 13/08* (2006.01)
(Continued)

(52) U.S. Cl.
CPC .......... *B25J 9/1697* (2013.01); *B25J 9/1666* (2013.01); *B25J 9/1679* (2013.01); *B25J 13/08* (2013.01);
(Continued)

(58) Field of Classification Search
CPC ...... B25J 9/1697; B25J 9/1666; B25J 9/1679; B25J 13/08; B25J 19/023; G06T 7/50;
(Continued)

(56) References Cited

U.S. PATENT DOCUMENTS 9,102,055 B1 * 8/2015 Konolige ............... B25J 9/1612
9,486,921 B1 11/2016 Straszheim et al.
(Continued)

FOREIGN PATENT DOCUMENTS

CN 106927179 A 7/2017
CN 108408315 A 8/2018
(Continued)

OTHER PUBLICATIONS

German Office Action dated Nov. 29, 2021 in corresponding German Application No. 10 2020 124 221.2 (with English Translation).
(Continued)

*Primary Examiner* — Jeff A Burke
*Assistant Examiner* — Kyle T Johnson
(74) *Attorney, Agent, or Firm* — MEDLER FERRO WOODHOUSE & MILLS PLLC

(57) ABSTRACT

A system and method for performing object detection are presented. The system receives spatial structure information associated with an object which is or has been in a camera field of view of a spatial structure sensing camera. The spatial structure information is generated by the spatial structure sensing camera, and includes depth information for an environment in the camera field of view. The system determines a container pose based on the spatial structure information, wherein the container pose is for describing at least one of an orientation for the container or a depth value for at least a portion of the container. The system further determines an object pose based on the container pose, wherein the object pose is for describing at least one of an orientation for the object or a depth value for at least a portion of the object.

20 Claims, 30 Drawing Sheets

Related U.S. Application Data

(60) Provisional application No. 62/985,336, filed on Mar. 5, 2020.

(51) Int. Cl.
  *G06T 7/50* (2017.01)
  *G06T 7/73* (2017.01)
  *H04N 23/695* (2023.01)

(52) U.S. Cl.
  CPC .................. *G06T 7/50* (2017.01); *G06T 7/73* (2017.01); *H04N 23/695* (2023.01); *G06T 2207/10028* (2013.01); *G06T 2207/30241* (2013.01)

(58) Field of Classification Search
  CPC ............. G06T 7/73; G06T 2207/10028; G06T 2207/30241; G06T 2207/30208; G06T 7/74; H04N 23/695; H04N 13/271; H04N 23/90
  See application file for complete search history.

(56) References Cited

U.S. PATENT DOCUMENTS

| | | | |
|---|---|---|---|
| 10,150,564 B2 | 12/2018 | Porat | |
| 10,369,698 B1 | 8/2019 | Islam et al. | |
| 10,740,911 B2* | 8/2020 | Phan | G06V 20/10 |
| 11,130,237 B1* | 9/2021 | Ye | B25J 13/08 |
| 2011/0123122 A1* | 5/2011 | Agrawal | G06T 7/74 |
| | | | 382/203 |
| 2012/0053724 A1 | 3/2012 | Okamoto et al. | |
| 2012/0314059 A1* | 12/2012 | Hoffmann | G06T 7/0004 |
| | | | 348/135 |
| 2013/0054029 A1* | 2/2013 | Huang | G05D 1/0038 |
| | | | 901/30 |
| 2013/0201346 A1* | 8/2013 | Kanno | H04N 7/18 |
| | | | 348/169 |
| 2014/0039679 A1* | 2/2014 | Ando | B25J 9/1697 |
| | | | 901/47 |
| 2015/0003678 A1* | 1/2015 | Watanabe | G06T 19/20 |
| | | | 382/103 |
| 2015/0224650 A1 | 8/2015 | Xu et al. | |
| 2015/0290795 A1 | 10/2015 | Oleynik | |
| 2016/0059412 A1 | 3/2016 | Oleynik | |
| 2018/0186570 A1* | 7/2018 | Porat | B60L 58/12 |
| 2019/0034727 A1 | 1/2019 | Chihara et al. | |
| 2019/0102965 A1 | 4/2019 | Greyshock et al. | |
| 2019/0351547 A1 | 11/2019 | Onuma et al. | |
| 2020/0047331 A1* | 2/2020 | Chitta | B25J 13/08 |
| 2020/0061811 A1* | 2/2020 | Iqbal | G06N 3/08 |
| 2020/0078941 A1* | 3/2020 | Oka | B25J 9/1653 |
| 2020/0164507 A1* | 5/2020 | Murase | B25J 9/1697 |
| 2020/0269429 A1* | 8/2020 | Chavez | B25J 15/0052 |
| 2020/0391385 A1 | 12/2020 | Oka et al. | |

FOREIGN PATENT DOCUMENTS

| | | |
|---|---|---|
| CN | 108622589 A | 10/2018 |
| CN | 108698224 A | 10/2018 |
| CN | 108806115 A | 11/2018 |
| CN | 110116406 A | 8/2019 |
| DE | 10 2013 001 603 B4 | 8/2013 |
| DE | 10 2013 012 224 B4 | 2/2014 |
| JP | 61-206709 A | 9/1986 |
| JP | 2004-231357 A | 8/2004 |
| JP | 2018-20423 A | 2/2018 |
| JP | 2018-202550 A | 12/2018 |
| JP | 2019025566 A | 2/2019 |

OTHER PUBLICATIONS

International Search Report dated May 11, 2021 in corresponding International Patent Application No. PCT/JP2021/008792.
Written Opinion of the International Searching Authority dated May 11, 2021 in corresponding International Patent Application No. PCT/JP2021/008792.
Office Action dated Apr. 9, 2021 in Chinese Application No. 202010710294.2 (with English Translation).
JP2018202550 Translation (Year: 2018).
JPS61206709 Translation (Year: 1986).
Chinese Office Action issued in corresponding Chinese Patent Application No. 202011186066.6 dated Aug. 2, 2021.

* cited by examiner

METHOD AND COMPUTING SYSTEM FOR PERFORMING CONTAINER DETECTION AND OBJECT DETECTION

CROSS-REFERENCE TO RELATED APPLICATION(S)

The present application claims the benefit of U.S. Provisional Application No. 62/985,336, entitled "A ROBOTIC SYSTEM WITH OBJECT RECOGNITION MECHANISM," and filed Mar. 5, 2020, the entire content of which is incorporated by reference herein.

FIELD OF THE INVENTION

The present disclosure is related to computing systems and methods for container detection and object detection.

BACKGROUND OF THE INVENTION

As automation becomes more common, robots are being used in more environments, such as in warehousing and retail environments. For instance, robots may be used to interact with merchandise or other objects in a warehouse. The movement of the robot may be fixed, or may be based on an input, such as information generated by a sensor in the warehouse.

SUMMARY

One aspect of the present disclosure relates to a computing system, method, and/or non-transitory computer-readable medium having instructions for performing object detection. The computing system may include a communication interface configured to communicate with a robot having a robot arm that has a spatial structure sensing camera disposed on the robot arm, wherein the spatial structure sensing camera has a camera field of view. The at least one processing circuit may be configured to perform the method when an object within a container is or has been in the camera field of view while the container is in an opened position. The method may involve receiving spatial structure information that includes depth information for an environment in the camera field of view, wherein the spatial structure information is generated by the spatial structure sensing camera, and determining a container pose based on the spatial structure information, wherein the container pose is for describing at least one of an orientation for the container or a depth value for at least a portion of the container. The method may further involve determining an object pose based on the container pose, wherein the object pose is for describing at least one of an orientation for the object or a depth value for at least a portion of the object, and outputting a movement command for causing robot interaction with the object, wherein the movement command is generated based on the object pose.

DETAILED DESCRIPTION OF THE FIGURES

Figure 1A:
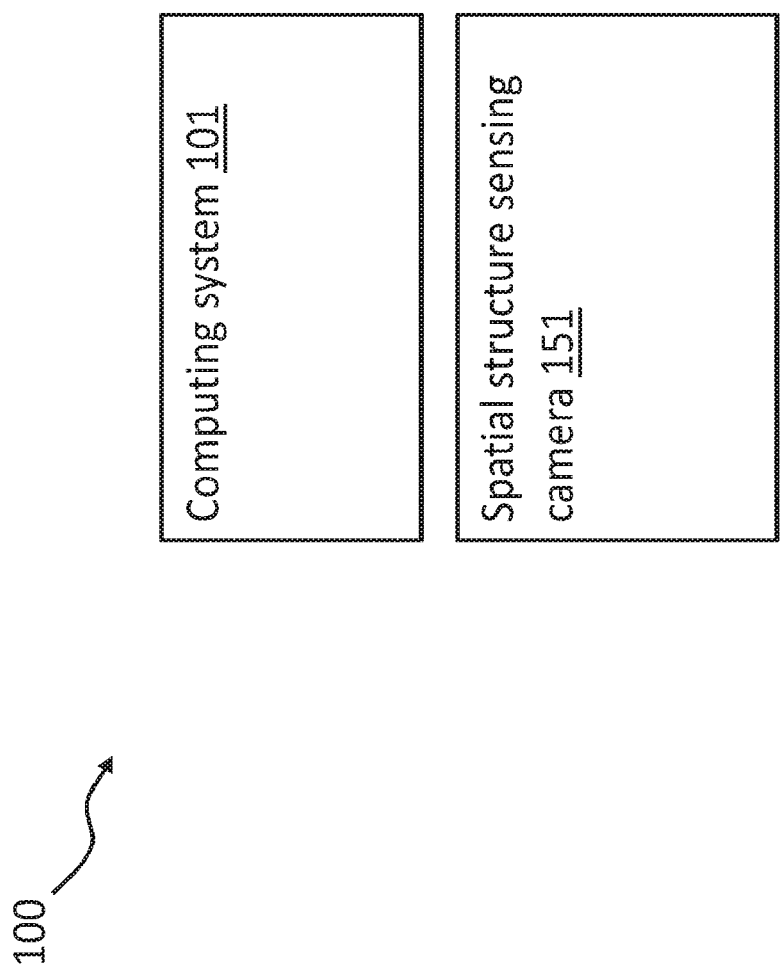
FIGS. 1A through 1E illustrate a computing system configured for receiving and processing spatial structure information and/or sensed object identifier information consistent with embodiments hereof.

One aspect of the present disclosure relates to facilitating robot interaction with content of a drawer or other container, such as merchandise or any other object disposed within the container (the term "or" may be used herein to refer to "and/or"). The robot interaction may include, e.g., a robot hand grasping or otherwise picking up an object disposed within the container. The robot interaction may occur, e.g., at a warehouse, a retail space, or any other environment. In some cases, facilitating the robot interaction involves determining a pose of the object within the container, wherein the pose may refer to at least one of an orientation or depth of the object relative to a camera or some other reference point, so that the robot hand can be moved appropriately to retrieve or otherwise pick up the object.

Various embodiments relate to determining the pose of an object (also referred to as an object pose) by performing an open container detection, in which information about an opened container is determined, wherein the object may be disposed within the container. These embodiments may provide a manner of determining the object pose that is, e.g., more robust and tolerant to imaging noise or other sources of measurement error. The imaging noise may affect, e.g., a point cloud or other spatial structure information used to measure the object. The measurement error introduced into the point cloud may cause an erroneous determination of, e.g., an orientation and/or depth of the object. In some cases, an error of even a few millimeters or few degrees may affect the robot interaction, which may in some circumstances rely on an accuracy that is millimeter-level or better with respect to determining a relative location between the robot hand and the object. Because measurement error for the object may prevent or impede such accuracy, one aspect of the present disclosure relates to using measurements regarding the container in which the object is disposed, and using such measurements to infer or otherwise determine a pose or other information regarding the object.

In some cases, the imaging noise may also affect direct measurement of a portion of the container, such as a surface on which the object is disposed (the surface may also be referred to as a container surface). One aspect of the present disclosure relates to compensating against measurement error affecting the container surface by making measurements of another portion of the container, such as a rim of the container (also referred to as a container rim). In these cases, the container rim may occupy a space which is less affected by the imaging noise, and thus may yield more reliable or trustworthy measurements. The measurements regarding the container rim may be used to infer or otherwise determine a pose or other information regarding the container surface. Such a determination may be based on, e.g., a known spacing separating the container surface and the container rim.

In some cases, the measurements made regarding the container may be used to perform motion planning, such as motion planning involved in retrieving an object from the container. For instance, the measurements regarding the container rim may provide information regarding where a sidewall of the container is located. When a robot is retrieving the object from the container, an object movement path may be planned so as to avoid collision between the sidewall of the container and the robot or the object. In some cases, measurements regarding the container may be used to virtually divide the container into different segments, as discussed below in more detail.

In some cases, facilitating robot interaction with an object may rely on using information regarding an object identifier (if any) disposed on the object. The object identifier may include a visual marking, such as a barcode, a logo or symbol (e.g., alphanumeric symbol), or other visual pattern which identifies the object. In some instances, the object identifier may be printed on a surface of the object. In some cases, the object identifier may be printed on a sticker or other layer of material which is adhered to or otherwise disposed on the object. If the object is a box holding one or more items, the object identifier may identify the one or more items, or more generally identify a content of the box. The information regarding the object identifier that is used to facilitate the robot interaction may include, e.g., a location of the object identifier (also referred to as an object identifier location) or information encoded into the object identifier, such as information encoded into a barcode. In some instances, the object identifier location may be used to narrow down which portion of a point cloud or other spatial structure information should be searched to detect a particular object. For instance, if the object identifier is a barcode location, such a search may be limited to a portion of the point cloud corresponding to a region surrounding the barcode location. Such an embodiment may facilitate a more focused and efficient search for the object. In some cases, if an object size is encoded into the barcode or other object identifier, that information may be used to search for the object from the point cloud or other spatial structure information, or to plan how the robot can grasp or otherwise interact with the robot.

FIG. 1A illustrates a system 100 for processing spatial structure information for object detection, as discussed below in more detail. In the embodiment of FIG. 1A, the system 100 may include a computing system 101 and a spatial structure sensing camera 151 (also referred to as a spatial structure sensing device 151). In this example, the spatial structure sensing camera 151 may be configured to generate spatial structure information (also referred to as spatial information or spatial structure data) that includes depth information about an environment in which the spatial structure sensing camera 151 is located, or more specifically about an environment in the camera 151's field of view (also referred to as a camera field of view). The computing system 101 in FIG. 1A may be configured to receive and process the spatial structure information. For instance, the computing system 101 may be configured to use the depth information in the spatial structure information to distinguishing between different structures in the camera field of view, or more generally to identify one or more structures in the camera field of view. The depth information in this example may be used to determine an estimate for how the one or more structures are spatially arranged in three-dimensional (3D) space.

In one example, the spatial structure sensing camera 151 may be located in a warehouse, a retail space (e.g., a store), or other premises. In such an example, the warehouse or retail space may include various merchandise or other objects. The spatial structure sensing camera 151 may be used to sense information about the objects, and/or about structures containing the objects, such as drawers or other types of containers. As stated above, the spatial structure sensing camera 151 may be configured to generate spatial structure information, which may describe, e.g., how a structure for a piece of merchandise and/or how a structure of a container are arranged in 3D space. The computing system 101 in such an example may be configured to receive and process the spatial structure information from the spatial structure sensing camera 151. The computing system 101 may be located at the same premises, or may be located remotely. For instance, the computing system 101 may be part of a cloud computing platform hosted in a data center which is remote from the warehouse or retail space, and may be communicating with the spatial structure sensing camera 151 via a network connection.

Figure 1B:
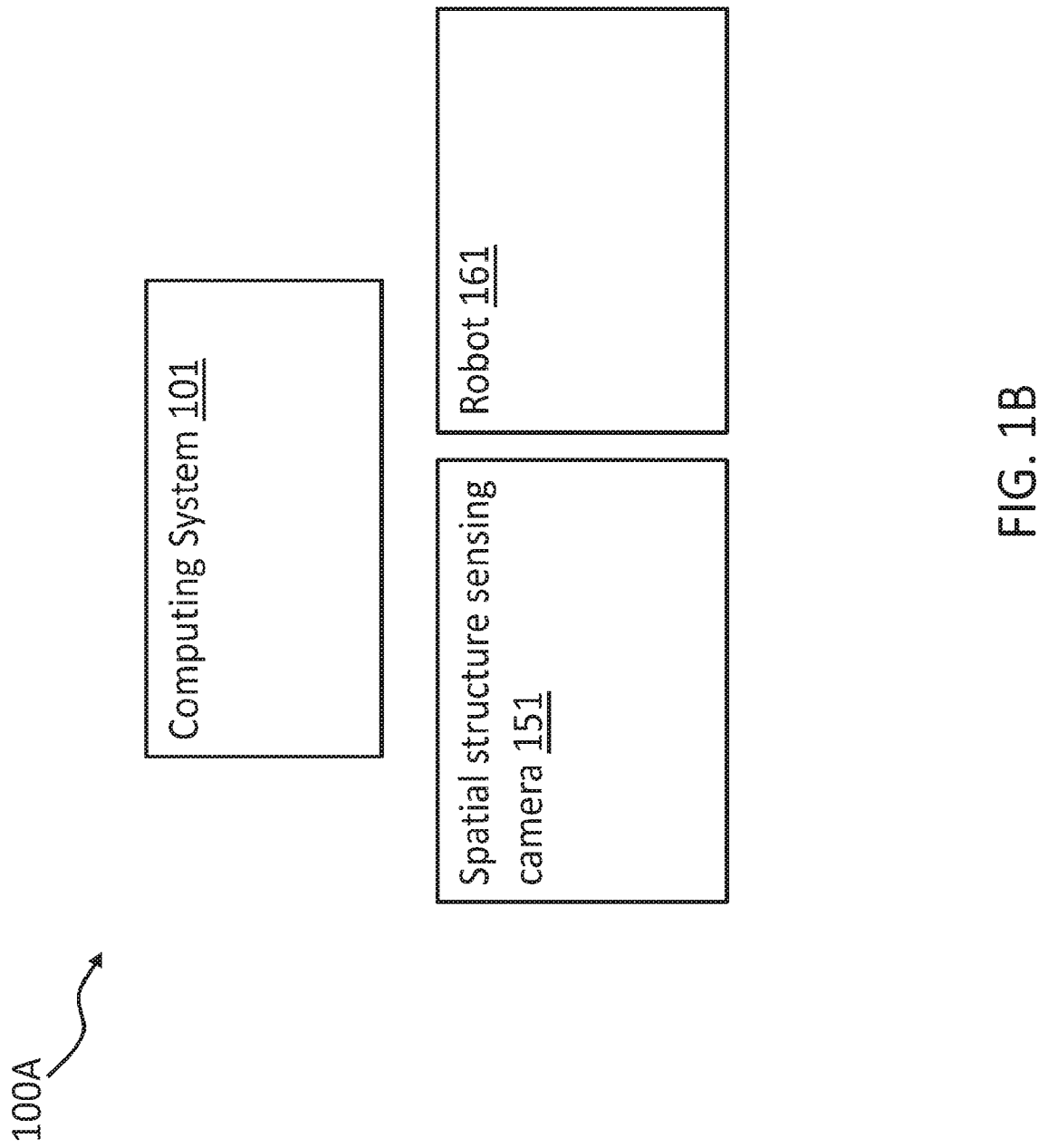

In an embodiment, the system 100 may be a robot operation system for interacting with various objects in an environment of the spatial structure sensing camera 151. For example, FIG. 1B illustrates a robot operation system 100A, which may be an embodiment of the system 100 of FIG. 1A. The robot operation system 100A may include the computing system 101, the spatial structure sensing camera 151, and a robot 161. In an embodiment, the robot 161 may be used to interact with one or more objects in the environment of the spatial structure sensing camera 151, such as with merchandise or other objects in a warehouse. For example, the robot 161 may be configured to pick up the merchandise from a drawer or other container, and to move the merchandise from the container to another location (e.g., a conveyor belt outside the drawer).

In an embodiment, the computing system 101 of FIGS. 1A and 1B may form or be part of a robot control system (also referred to as a robot controller), which is part of the robot operation system 100A. The robot control system may be a system that is configured to, e.g., generate movement commands or other commands for the robot 161. In such an embodiment, the computing system 101 may be configured to generate such commands based on, e.g., spatial structure information generated by the spatial structure sensing camera 151. In an embodiment, the computing system 101 may form or be part of a vision system. The vision system may be a system which generates, e.g., vision information which describes an environment in which the robot 161 is located, or more specifically describes an environment in which the spatial structure sensing camera 151 is located. The vision information may include the spatial structure information, which may also be referred to as 3D information or 3D imaging information because it can indicate how a structure is laid out or otherwise arranged in 3D space. In some cases, the robot 161 may include a robot arm which has a robot hand or other end effector which forms one end of the robot arm, and the spatial structure information may be used by the computing system 101 to control placement of the robot hand. In some cases, if the computing system 101 forms a vision system, the vision system may be part of the robot control system discussed above, or may be separate from the robot control system. If the vision system is separate from the robot control system, it may be configured to output information regarding the environment in which the robot 161 is located. The robot control system in such an example may receive such information, and control movement of the robot 161 based on the information.

Figure 1C:
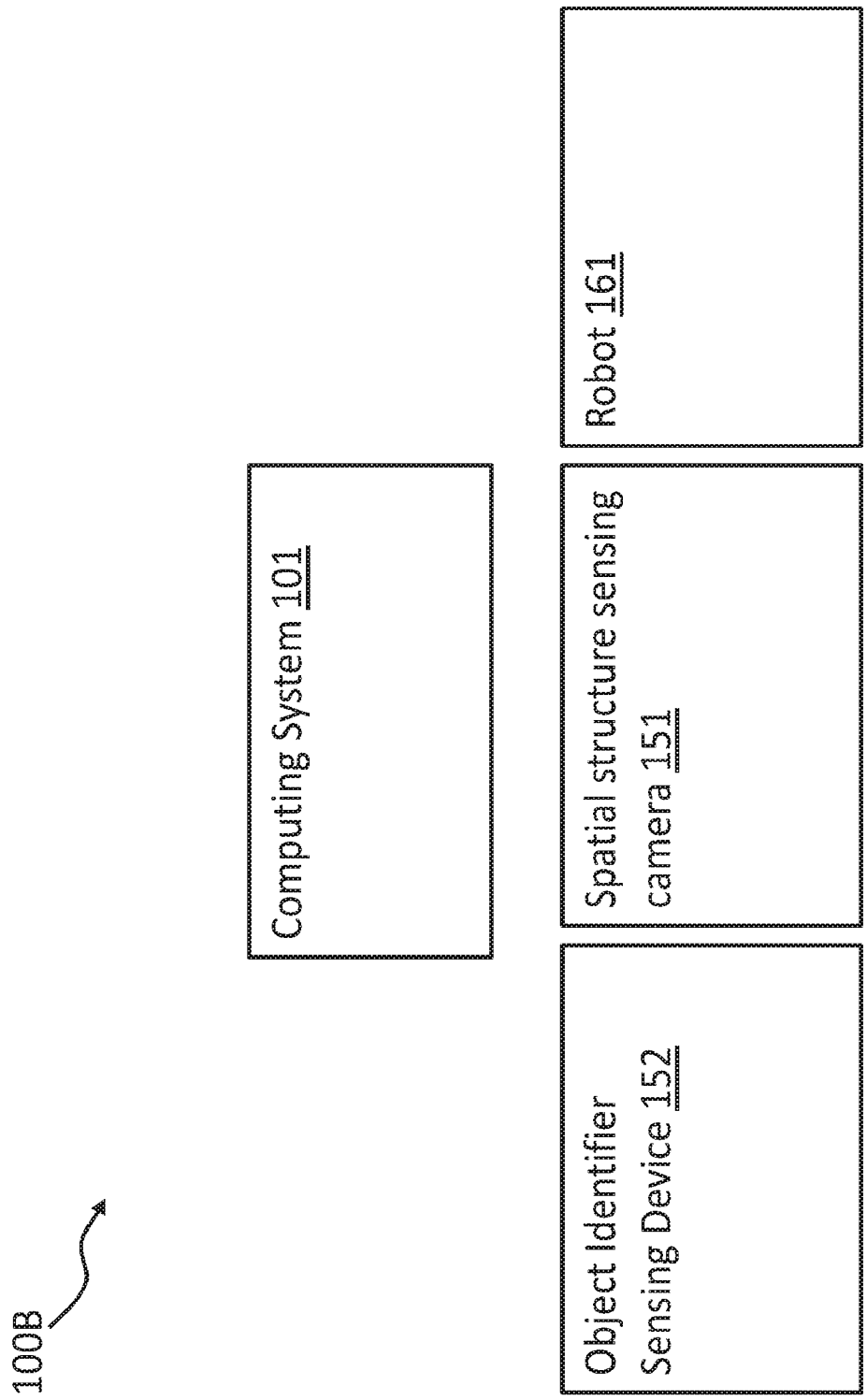

In an embodiment, the system 100 may include an object identifier sensing device 152, such as a barcode sensing device (also referred to as a barcode reader). More particularly, FIG. 1C depicts a system 100B (which is an embodiment of the system 100/100A) that includes the computing system 101, the spatial structure sensing camera 151, the robot 161, and further includes the object identifier sensing device 152. In some cases, the object identifier sensing device 152 may be configured to detect an object identifier disposed on or adjacent to an object. As stated above, the object identifier may be a visual marking that identifies the object. If the object is a box or other object for holding merchandise or some other item, the object identifier may in an embodiment identify the item or other content of the box. As also stated above, the object identifier may in some examples be a barcode. In some instances, the barcode may have a spatial pattern, such as a series of dark stripes or an array of dark squares (e.g., a QR code), or any other barcode in a field of view of the object identifier sensing device 152 (e.g., barcode sensing device). For example, the barcode may be disposed on a piece of merchandise or other object in a warehouse. The object identifier sensing device 152 may be configured to sense information about the object identifier. This information (which may also be referred to as sensed object identifier information) can include information encoded into the object identifier, a location of the object identifier (also referred to as object identifier location), or any other information regarding the object identifier. If the object identifier is a barcode, the information encoded into the barcode may include, e.g., a stock keeping unit (SKU) code or universal product code (UPC).

In an embodiment, the object identifier sensing device 152 and/or the spatial structure sensing camera 151 may be attached to a stationary mounting point, such as a mounting point that is stationary within a warehouse or retail space. In an embodiment, the spatial structure sensing camera 151 and/or the object identifier sensing device 152 may be attached to a robot arm of the robot 161. In a more specific example, the object identifier sensing device 152 and/or the spatial structure sensing camera 151 may be attached to or disposed on (or disposed close to) a robot hand or other end effector which forms one end of the robot arm. In such an example, the object identifier sensing device 152 and the spatial structure sensing camera 151 may be referred to as an on-hand object identifier sensing device (e.g., an on-hand barcode reader) and an on-hand spatial structure sensing camera, respectively. In some cases, the computing system 101 may be configured to control the robot 161 to move the on-hand spatial structure sensing camera and/or the on-hand object identifier sensing device to an optimal location for sensing an environment of the robot 161, as discussed below in more detail.

In an embodiment, if the computing system 101 is part of a robot control system, the computing system 101 may be configured to generate one or more movement commands for controlling movement of the robot 161, as discussed below in more detail. These movement commands may include, e.g., object movement commands, sensor movement commands, and container movement commands. A sensor movement command may be used to move the spatial structure sensing camera 151 and/or the object identifier sensing device 152. A container movement command may be used to move a container that contains a merchandise or other object, such as a movement command to open or close the container. An object movement command may be used to move merchandise or other object in a warehouse or other premises, or more specifically an object disposed in the container.

Figure 1D:
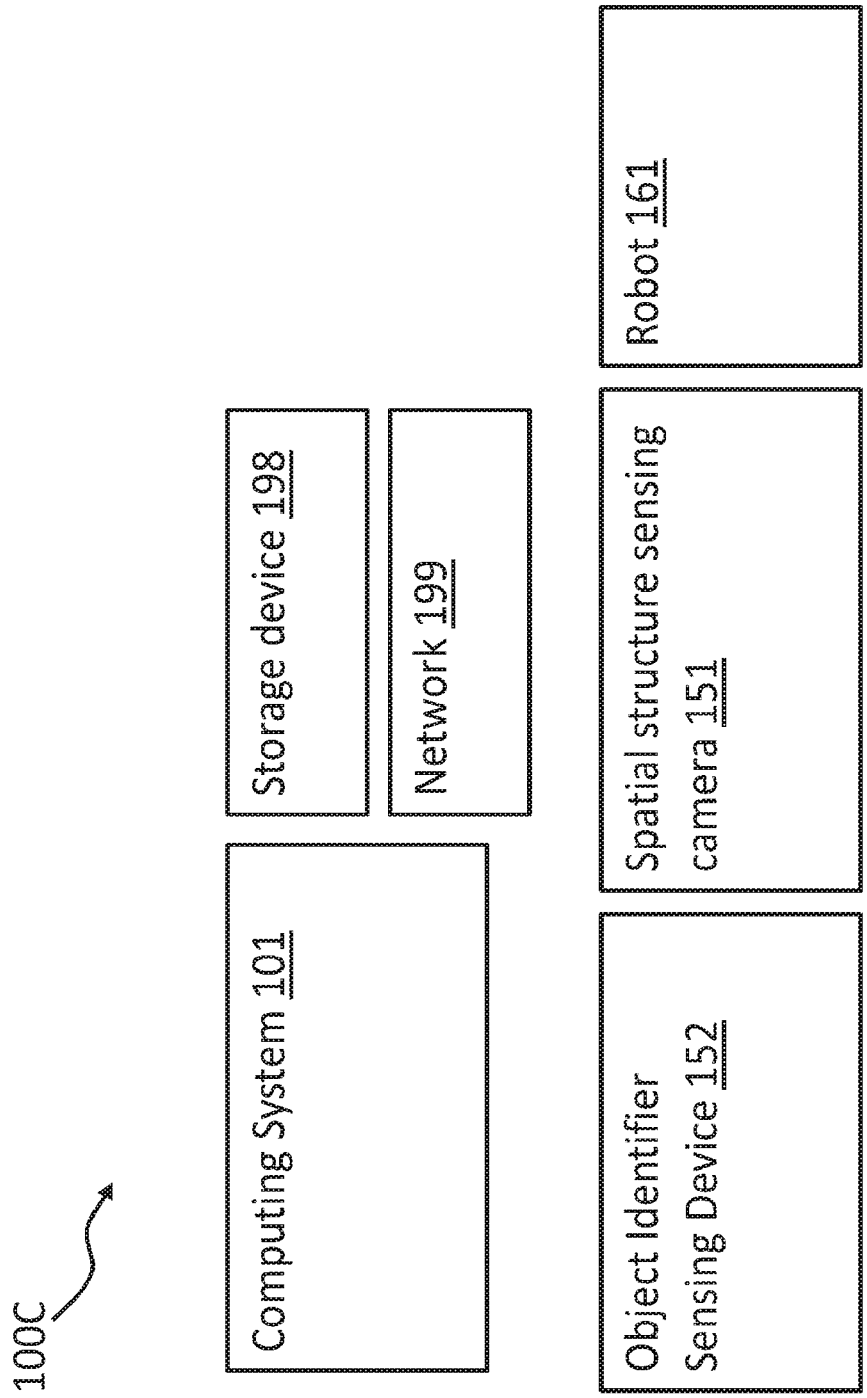

In an embodiment, the components of system 100 may be configured to communicate via a network and/or a storage device. More particularly, FIG. 1D depicts a system 100C that is an embodiment of the system 100/100A/100B of FIGS. 1A-1C. The system 100C includes the computing system 101, the spatial structure sensing camera 151, the robot 161, the object identifier sensing device 152, and further includes a network 199 and a data storage device 198 (or any other type of a non-transitory computer-readable medium) separate from the computing system 101. In some instances, the storage device 198 may be configured to store information generated by the object identifier sensing device 152, the spatial structure sensing camera 151, and/or the robot 161, and to make the stored information available to the computing system 101. In such an example, the computing system 101 may be configured to access the stored information by retrieving (or, more generally, receiving) the information from the data storage device 198.

In FIG. 1D, the storage device 198 may include any type of non-transitory computer-readable medium (or media), which may also be referred to as a non-transitory computer readable storage device. Such non-transitory computer-readable medium or storage device may be configured to store and provide access to stored information (also referred to as stored data). Examples of the non-transitory computer readable medium or storage device may include, but is not limited to, an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a solid state drive, a static random access memory (SRAM), a portable compact disc read-only memory (CD-ROM), a digital versatile disk (DVD), and/or a memory stick.

In an embodiment, the network 199 may facilitate communication between the computing system 101, the spatial structure sensing camera 151, the object identifier sensing device 152, and/or the robot 161. For instance, the computing system 101 and/or the storage device 198 may receive information which is generated by the spatial structure sensing camera 151 and/or the object identifier sensing device 152 (e.g., spatial structure information or sensed object identifier information) via the network 199. In such an example, the computing system 101 may be configured to provide one more commands (e.g., movement commands) to the robot 161 via the network 199. The network 199 may provide an individual network connection or a series of network connections to permit the computing system 101 to receive information and/or to output a command consistent with the embodiments hereof.

In FIG. 1D, the network 199 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. Wireless standards may use various channel access methods, e.g., FDMA, TDMA, CDMA, OFDM, or SDMA. In some embodiments, different types of information may be transmitted via different links and standards. In other embodiments, the same types of information may be transmitted via different links and standards. Network communications may be conducted via any suitable protocol, including, e.g., http, tcp/ip, udp, ethernet, ATM, etc.

The network 199 may be any type and/or form of network. The geographical scope of the network may vary widely and the network 199 can be a body area network (BAN), a personal area network (PAN), a local-area network (LAN), e.g., Intranet, a metropolitan area network (MAN), a wide area network (WAN), or the Internet. The topology of the network 199 may be of any form and may include, e.g., any of the following: point-to-point, bus, star, ring, mesh, or tree. The network 199 may be of any such network topology as known to those ordinarily skilled in the art capable of supporting the operations described herein. The network 199 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv4), or the link layer. The network 199 may be a type of broadcast network, a telecommunications network, a data communication network, or a computer network.

In an embodiment, the computing system 101, the spatial structure sensing camera 151, the object identifier sensing device 152, and/or the robot 161 may be able to communicate with each other via a direct connection rather than a network connection. For instance, the computing system 101 in such an embodiment may be configured to receive information from the spatial structure sensing camera 151 and/or the object identifier sensing device 152 via a dedicated wired communication interface, such as a RS-232 interface, a universal serial bus (USB) interface, and/or via a local computer bus, such as a peripheral component interconnect (PCI) bus.

In an embodiment, the spatial structure information generated by the spatial structure sensing camera 151 may refer to any type of information that describes how a structure is laid out or otherwise arranged in space, such as a three-dimensional (3D) space. More particularly, the spatial structure information may describe a 3D layout of the structure, or a 3D posture or disposition of the structure in 3D space. The structure may belong to, e.g., a container in an environment or field of view of the spatial structure sensing camera 151, or to an object disposed within the container. In some cases, the spatial structure information may indicate how the structure is oriented in 3D space. In some cases, the spatial structure information may include depth information which indicates one or more respective depth values for one or more locations on the structure, or more specifically on one or more surfaces of the structure. The depth value for a particular location may be relative to the spatial structure sensing camera 151, or relative to some other reference frame (e.g., a ceiling or a wall of the warehouse or retail space). In some cases, the depth values may be measured along an axis that is orthogonal to an imaginary plane on which the spatial structure sensing camera 151 is located. For example, if the spatial structure sensing camera 151 has an image sensor, the imaginary plane may be an image plane defined by the image sensor. In an embodiment, the spatial structure information may be used to determine a contour, or more generally a boundary, of a structure. The contour may be that of, e.g., a container or a portion of the container, or an object in the container. For instance, the spatial structure information may be used to detect one or more locations at which there is a sharp discontinuity in depth values, wherein such locations may indicate a boundary (e.g., edge) of a structure. In some instances, the boundary of the structure may be used to determine its shape or size.

In some cases, the spatial structure information may include or form a depth map. The depth map may be a bitmap that has a plurality of pixels that represent or otherwise correspond to various locations in the camera field of view, such as locations on one or more structures in the camera field of view. In such cases, some or all of the pixels may each have a respective depth value that indicates a depth of a respective location represented by or otherwise corresponding to that pixel. In some cases, the depth map may include 2D image information which describes a 2D appearance of the one or more structures in the camera field of view. For example, the depth map may include a 2D image. In such an example, each of the pixels of the depth map may further include a color intensity value or grayscale intensity value that indicates an amount of visible light reflecting off the location represented by or otherwise corresponding to the pixel.

In an embodiment, the spatial structure information may be or include a point cloud. The point cloud may identify a plurality of locations that describe one or more structures, such as a structure of a container and/or a structure of an object in the container. In some cases, the plurality of points may be respective locations on one or more surfaces of the one or more structures. In some cases, the point cloud may include a plurality of coordinates (e.g., 3D coordinates) that identify or otherwise describe the plurality of points. For instance, the point cloud may include a series of Cartesian or polar coordinates (or other data values) that specify respective locations or other features of the one or more structures. The respective coordinates may be expressed with respect to a reference frame (e.g., coordinate system) of the spatial structure sensing camera 151, or with respect to some other reference frame. In some cases, the respective coordinates are discrete and spaced apart from each other but may be understood to be representative of one or more contiguous surfaces of the one or more structures. In an embodiment, the point cloud may be generated from a depth map or other information (e.g., by the computing system 101).

In some embodiments, the spatial structure information may further be stored according to any appropriate format, such as polygon or triangular mesh models, non-uniform rational basis spline models, CAD models, parameterization of primitives (e.g., a rectangle may be defined according to a center and extensions in the x, y, and z directions, a cylinder can be defined by a center, a height, an upper radius, and a lower radius, etc.), etc.

As stated above, the spatial structure information is captured or otherwise generated via the spatial structure sensing camera 151. In an embodiment, the spatial structure sensing camera 151 may be or include a 3D camera or any other 3D image sensing device. The 3D camera may be a depth-sensing camera, such as a time-of-flight (TOF) camera or a structured light camera, or any other type of 3D camera. In some cases, the 3D camera may include an image sensor, such as a charge coupled devices (CCDs) sensor and/or complementary metal oxide semiconductors (CMOS) sensor. In an embodiment, the spatial structure sensing camera 151 may include lasers, a LIDAR device, an infrared device, a light/dark sensor, a motion sensor, a microwave detector, an ultrasonic detector, a RADAR detector, or any other device configured to capture spatial structure information.

Figure 1E:
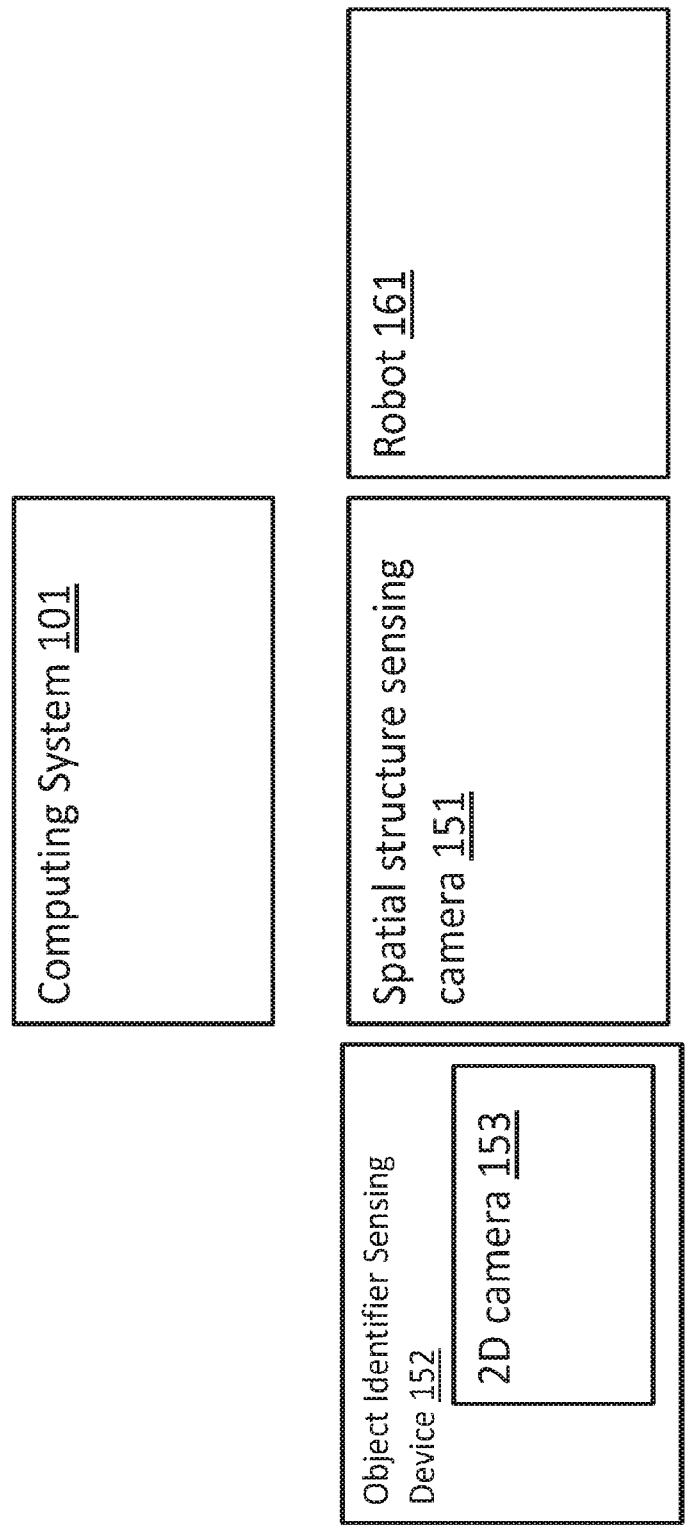

As stated above, the object identifier sensing device 152 may be configured to sense an object identifier and to generate sensed object identifier information, such as sensed barcode information which describes a barcode. The sensed object identifier information may describe, e.g., a location of the object identifier (e.g., a barcode location), information encoded into the object identifier, or some other object identifier information. If the object identifier sensing device 152 is a barcode sensing device, the barcode sensing device may in some cases include a laser or photodiode configured to emit light or other signal toward a region of the barcode, such as a region occupied by a dark stripe or dark square of the barcode, and may include a sensor configured to measure an amount of light or other signal reflected from the region. In some cases, as depicted in FIG. 1E, the object identifier sensing device 152 may include a 2D camera 153. The 2D camera 153 may include, e.g., a grayscale camera or a color camera. The 2D camera 153 may be configured to capture or otherwise generate 2D imaging information which describes or otherwise represents a visual appearance of an environment in a field of view of the 2D camera 153, including the appearance of a barcode or any other object identifier (if any) on an object in the field of view. Such a 2D camera 153 may include, e.g., an image sensor, such as a charge coupled devices (CCDs) sensor and/or complementary metal oxide semiconductors (CMOS) sensor. In some cases, the 2D image information may include a plurality of pixels that form a 2D image. Each pixel of the 2D image information may represent, e.g., an intensity or other property of light reflecting off a location corresponding to the pixel. In some cases, the 2D camera 153 may include a processing circuit configured to detect the barcode or other object identifier within the 2D image and to generate sensed object identifier information based on the object identifier. In some cases, if the spatial structure information includes a depth map which has 2D image information, the 2D image information may be generated by the 2D camera 153.

In an embodiment, the spatial structure sensing camera 151 and the object identifier sensing device 152 may be integrated into a single device. For instance, they may be enclosed by a single housing, and may have a fixed relative location and relative orientation. In some cases, they may share a single communication interface and/or a single power supply. In an embodiment, the spatial structure sensing camera 151 and the object identifier sensing device 152 may be two separate devices that are mounted to or otherwise attached to the robot 161, such as to a robot arm of the robot 161, as discussed below in more detail.

As stated above, the spatial structure information and/or sensed object identifier information may be processed by the computing system 101. In an embodiment, the computing system 101 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 101 may be performed as part of a cloud computing platform. The computing system 101 may be a single computing device (e.g., a desktop computer), or may include multiple computing devices.

Figure 2A:
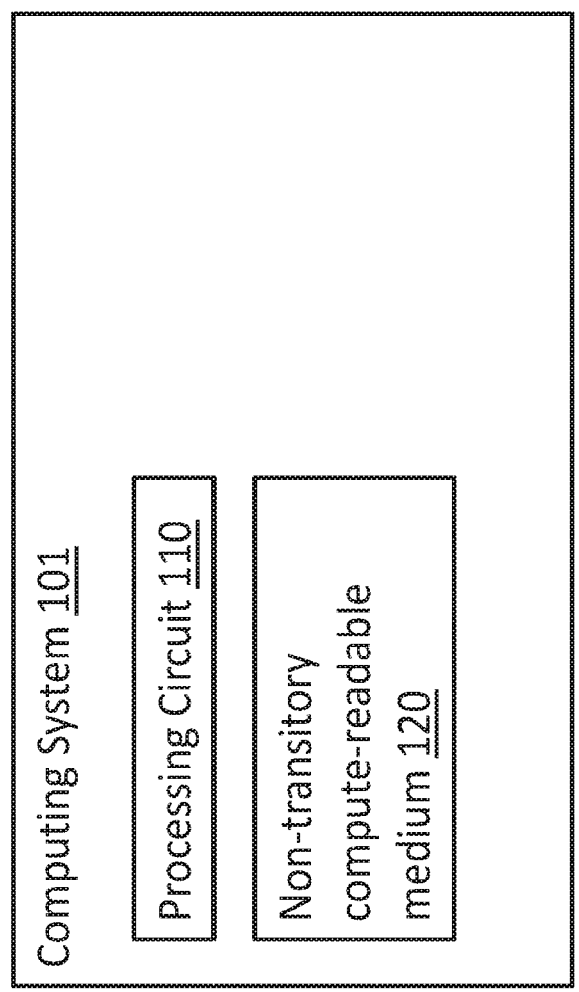
FIGS. 2A-2C provide block diagrams that illustrate a computing system configured for receiving and processing spatial structure information and/or sensed object identifier information consistent with embodiments hereof.

FIG. 2A provides a block diagram that illustrates an embodiment of the computing system 101. The computing system 101 includes at least one processing circuit 110 and a non-transitory computer-readable medium (or media) 120. In an embodiment, the processing circuit 110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit. In an embodiment, the non-transitory computer-readable medium 120 may be a storage device, such as an electronic storage device, a magnetic storage device, an optical storage device, an electromagnetic storage device, a semiconductor storage device, or any suitable combination thereof, for example, such as a computer diskette, a hard disk, a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium may include multiple storage devices. In certain cases, the non-transitory computer-readable medium 120 is configured to store spatial structure information generated by the spatial structure sensing camera 151 and/or sensed object identifier information generated by the object identifier sensing device 152. In certain cases, the non-transitory computer-readable medium 120 further stores computer readable program instructions that, when executed by the processing circuit 110, causes the processing circuit 110 to perform one or more methodologies described here, such as the operation described with respect to FIG. 4.

Figure 2B:
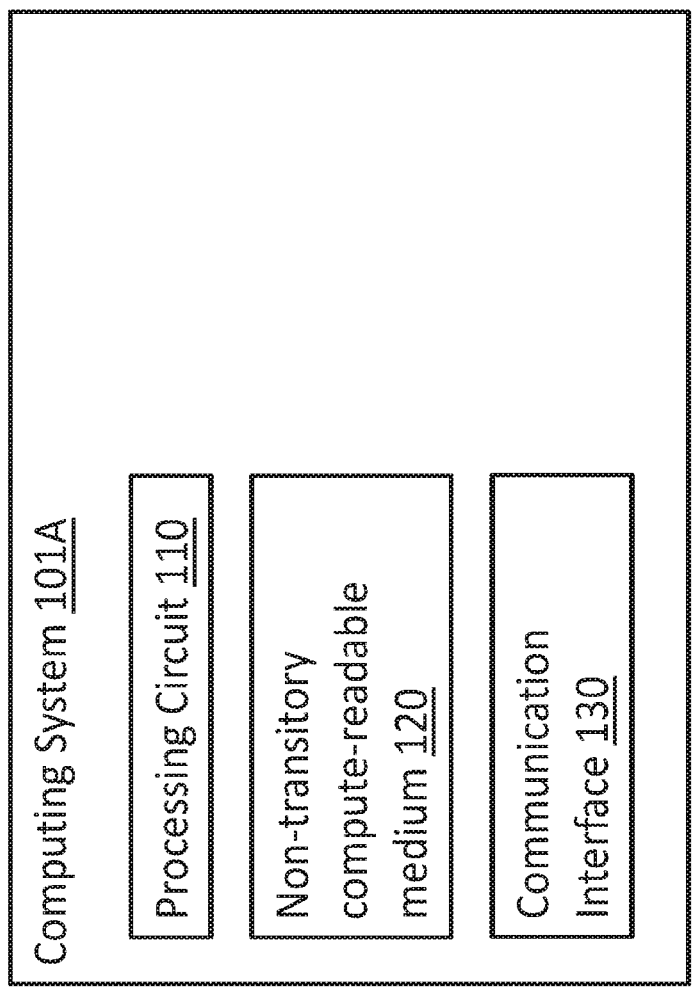

FIG. 2B depicts a computing system 101A that is an embodiment of the computing system 101 and includes a communication interface 130. The communication interface 130 may be configured to, e.g., receive spatial structure information generated by the spatial structure sensing camera 151 and/or sensed object identifier information (e.g., sensed barcode information) generated by the object identifier sensing device 152, such as via the storage device 198 and/or the network 199 of FIG. 1D, or via a more direct connection from the spatial structure sensing camera 151 or from the object identifier sensing device 152. In an embodiment, the communication interface 130 may be configured to communicate with the robot 161 of FIG. 1B. If the computing system 101 is not part of a robot control system, the communication interface 130 of the computing system 101 may be configured to communicate with the robot control system. The communication interface 130 may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
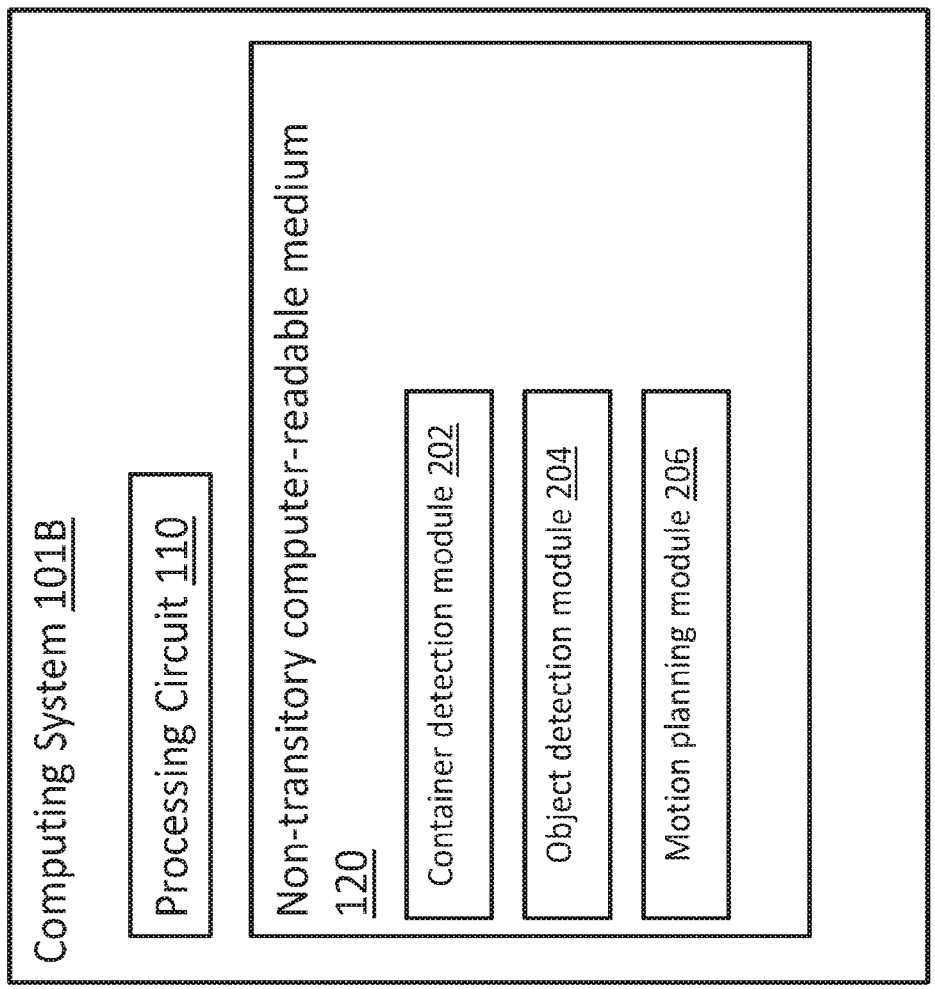

In an embodiment, the processing circuit 110 may be programmed by one or more computer-readable program instructions stored on the non-transitory computer-readable medium 120. For example, FIG. 2C illustrates a computing system 101B, which is an embodiment of the computing system 101/101A, in which the processing circuit 110 is programmed by one or more modules, including a container detection module, an object detection module 204, and/or a motion planning module 206, which are discussed below in more detail.

In an embodiment, the container detection module 202 may be configured to detect a container, such as a drawer, or more specifically to determine information about how the drawer is arranged in 3D space, such as its orientation and/or depth. As discussed below in more detail, the container detection module 202 may be configured to make such a determination using at least the spatial structure information. In some cases, the container detection module 202 may determine how a particular portion of the drawer, such as its bottom inner surface, is arranged in 3D space. In some implementations, the container detection module 202 may be configured to determine how the bottom inner surface is arranged in 3D space based on how another portion of the drawer, such as its rim, is arranged in 3D space.

In an embodiment, the object detection module 204 may be configured to detect an object that is within the container, such as a piece of merchandise disposed on the bottom inner surface of the drawer, or more specifically to determine how the object is arranged in 3D space, such as an orientation and/or depth of the object. In some cases, the object detection module 204 may make such a determination based on information generated by the container detection module 202 regarding how the drawer or other container is arranged in 3D space. In some cases, the object detection module 204 may be configured to use sensed object identifier information (e.g., sensed barcode information) to identify the object and/or a size of the object, as discussed below in more detail.

In an embodiment, the motion planning module 206 may be configured to determine robot motion for interacting with a container, for interacting with an object within the container, and/or for moving the spatial structure sensing camera 151 and/or the object identifier sensing device 152. For example, the robot motion may be part of a robot operation to grasp or otherwise pick up the object from the container and move the object elsewhere. The robot motion may be determined based on information generated, e.g., by the object detection module 204 regarding how the object is arranged in 3D space, and/or by the container detection module 202 regarding how the container is disposed in 3D space. It will be understood that the functionality of the modules as discussed herein is representative and not limiting.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 110 to perform one or more functional tasks. The modules and computer-readable instructions may be described as performing various operations or tasks when a processing circuit or other hardware component is executing the modules or computer-readable instructions. In some cases, the modules and computer-readable instructions may implement a method for performing container detection and plan robot interaction based on the container detection.

Figure 3A:
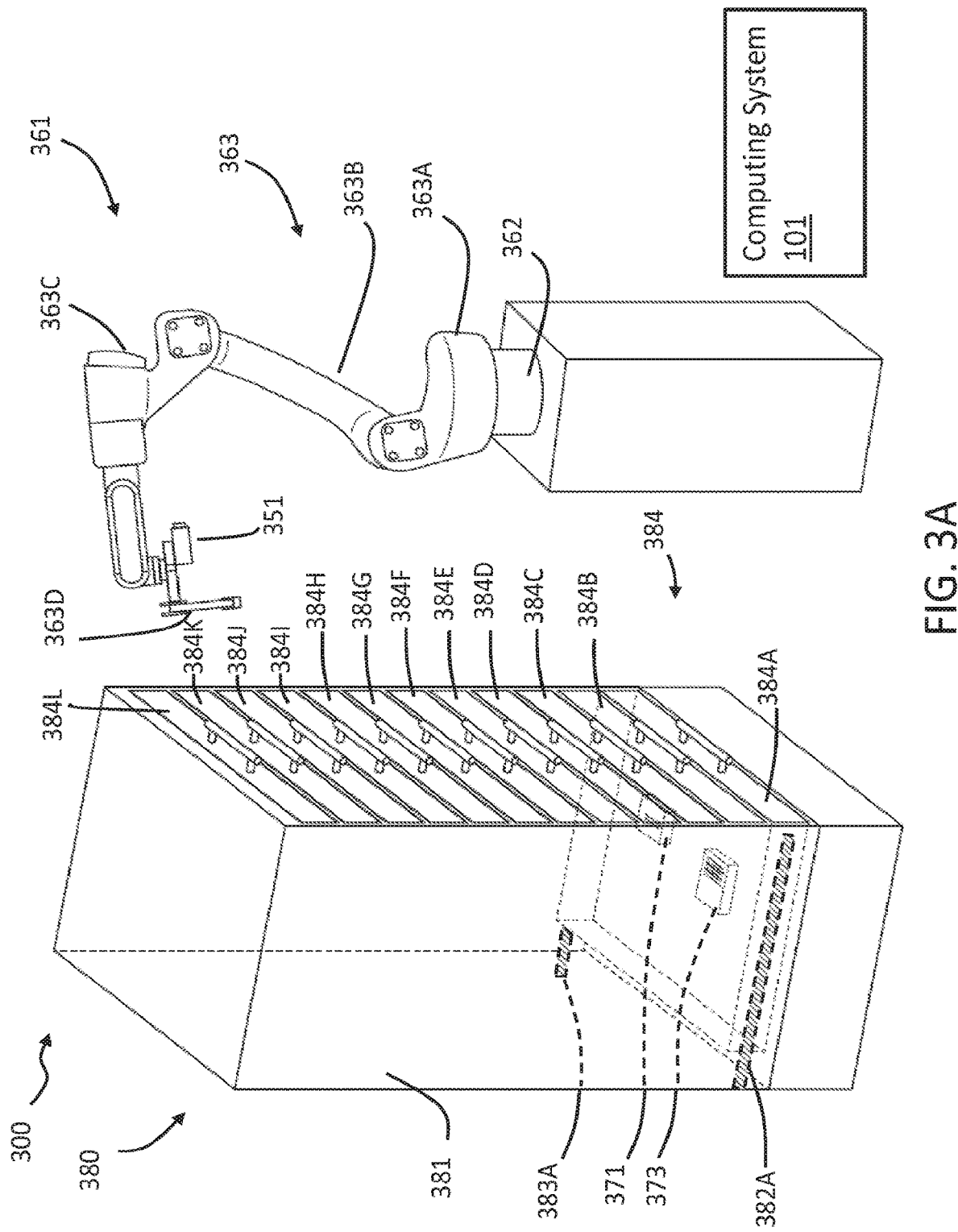
FIGS. 3A-3D illustrate an environment having a plurality of containers (e.g., drawers) and a robot for interacting with the containers based on spatial structure information generated by a spatial structure sensing camera, according to an embodiment hereof.
Figure 3B:
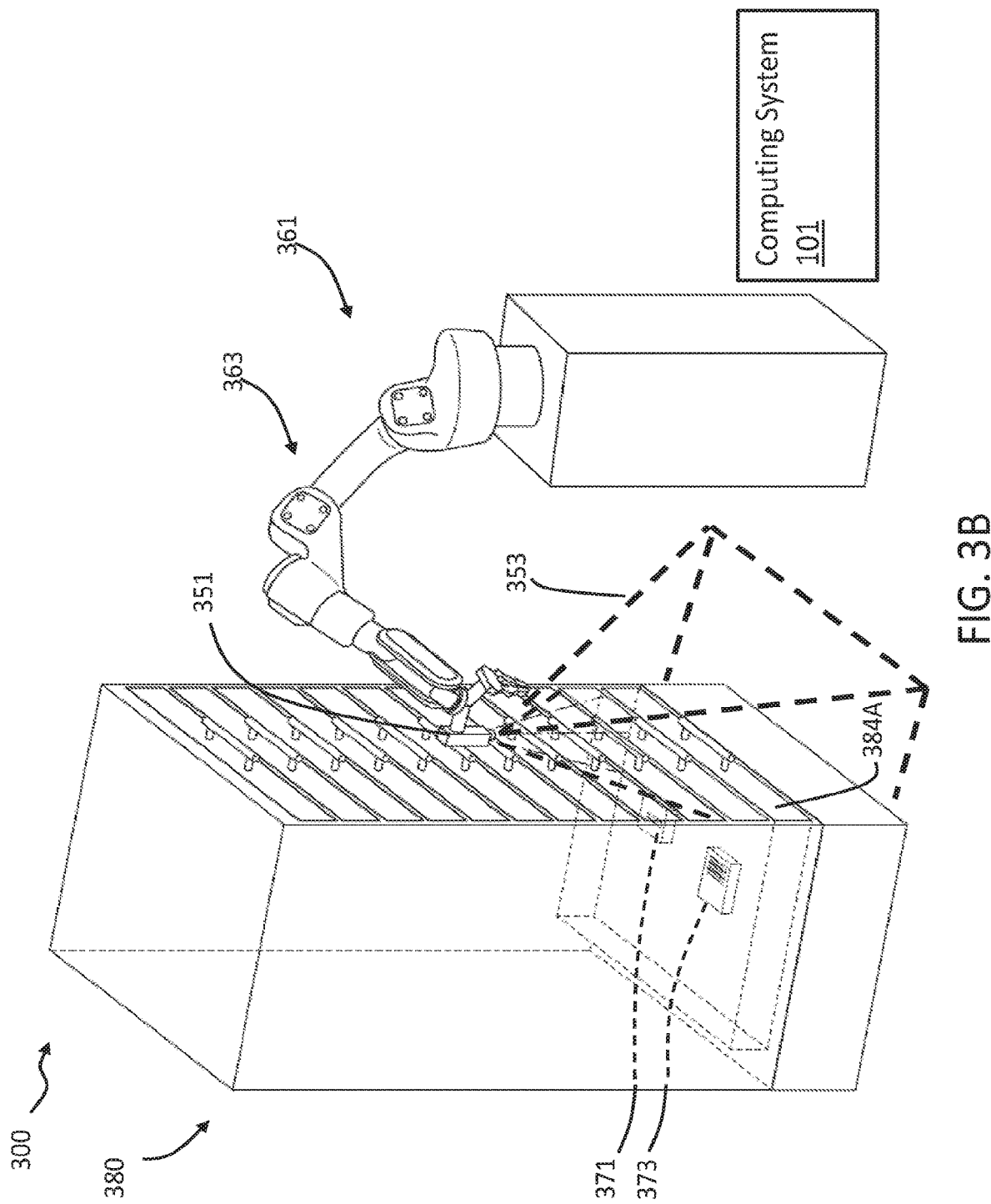
Figure 3C:
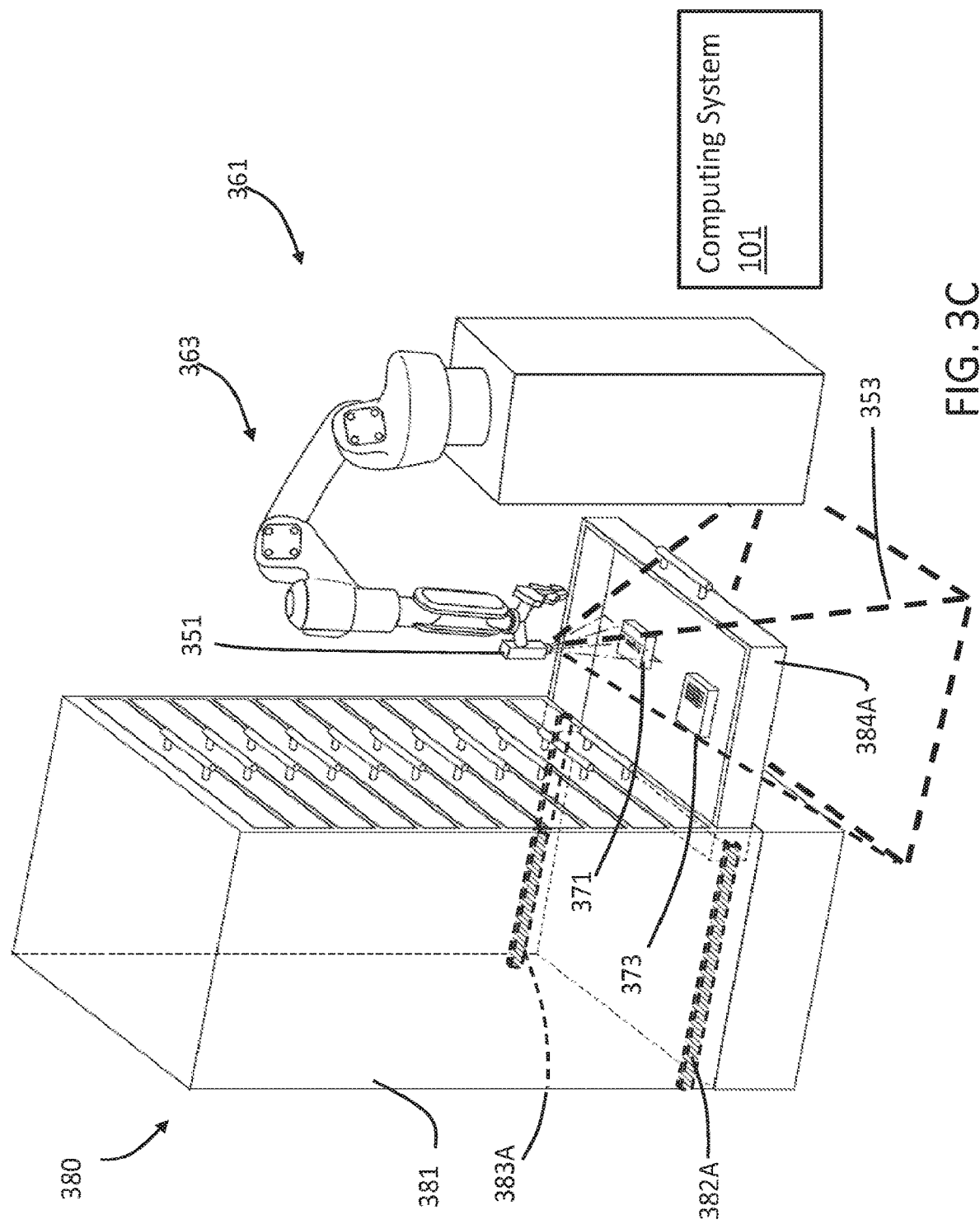

FIGS. 3A-3C illustrate an environment in which a method for container detection and/or robot interaction may occur. More specifically, FIG. 3A depicts a system 300 (which may be an embodiment of the system 100/100A/100B/100C of FIGS. 1A-1E) that includes the computing system 101, a robot 361, and a spatial structure sensing camera 351 (which may be an embodiment of the spatial structure sensing camera 151). In an embodiment, the robot 361 may include a base 362 and a robot arm 363. The base 362 may be used for mounting the robot 361, while the robot arm 363 may be used to interact with an environment of the robot 361. In an embodiment, the robot arm 363 may include a plurality of arm portions that are movable relative to each other. For instance, FIG. 3A illustrates arm portions 363A, 363B, 363C, and 363D that are rotatable and/or extendable relative to each other. For example, the robot arm 363 may include one or more motors or other actuators which are configured to rotate the arm portion 363A relative to the base 362, rotate the arm portion 363B relative to the arm portion 363A, and to rotate the arm portion 363C relative to the arm portion 363B. In this example, the arm portions 363A, 363B, and 363C may be links of the robot arm 363, while the arm portion 363D may be an end effector, such as a robot hand. In some cases, the robot hand may include a gripper that is configured to grip or otherwise pick up an object, so as to enable the robot arm 363 to interact with objects.

In the embodiment of FIG. 3A, the spatial structure sensing camera 351 may be mounted on or otherwise attached to the robot 361, or more specifically to the robot arm 363 of the robot 361, at a location that is part of or close to the end effector 363D. The spatial structure sensing camera 351 may be part of an imaging system. In some scenarios, the imaging system may further include an object identifier sensing device, which is discussed below with respect to FIG. 7A. In some cases, the object identifier sensing device may also be attached to the robot arm 363, such as at a location on or close to the end effector 363D.

As depicted in FIG. 3A, the system 300 may further include one or more containers 384, such as containers 384A-384L. In some scenarios, the containers 384A-384L may be located in a warehouse or retail space, and may be used to contain items, such as merchandise or other objects. In the example of FIG. 3A, the containers 384A-384L may be housed in a cabinet 380, which may provide a housing 381 that arranges the containers 384A-384L in a stack. In this example, the containers 384A-384L may each be a drawer that is movable between a closed position and an open position. Each of the containers 384A-384L may be attached to the cabinet 380 via one or more links. For example, FIG. 3A illustrates a pair of rails 382A, 383A that are attached to an inner surface of the housing 381 and which allow the container 382A to slide between an open position and a closed position. In some situations, at least one of the containers 384A-384L may contain one or more objects. For instance, container 384A may include objects, 371, 373, which may be merchandise in the warehouse or retail space. As an example, objects 371, 373 may each be a box that is or that holds items, such as merchandise to be shipped or sold.

As stated above, the spatial structure sensing camera 351 (and/or the object identifier sensing device) may be an on-hand camera device mounted to or otherwise placed on the robot arm 363. This placement may allow flexibility in the location and/or orientation of the spatial structure sensing camera 351 (and/or object identifier sensing device). More specifically, rather than mount the spatial structure sensing camera 351 (and/or the object identifier sensing device) at a stationary mounting point, FIGS. 3A-3C illustrate an embodiment in which the robot arm 363 is able to move the spatial structure sensing camera 351 (and/or the object identifier sensing device) to various locations and/or orientations. For instance, such an embodiment allows the robot arm 363 to adjust a distance between an object being sensed and the spatial structure sensing camera 351 (and/or object identifier sensing device), so as to adjust a level of focus and/or resolution in the resulting spatial structure information (and/or sensed object identifier information).

FIG. 3B further illustrates a situation in which the containers 384A-384L of FIG. 3A, such as container 384A, are each in a closed position. When the container 384A is in the closed position, its content (e.g., objects 371, 373) may be inaccessible by the robot 361, or more specifically inaccessible by the robot arm 363. For example, an inner surface (e.g., bottom inner surface) of the container 384A may be substantially unexposed to an environment outside the housing 381 of the cabinet 380 when the container 384A is in the closed position. Further, the content of the container 384A (e.g., objects 371, 373) may be hidden from view. More specifically, they may be blocked from a camera field of view 353 of the spatial structure sensing camera 351 (and/or a field of view of the object identifier sensing device). In such an example, an exterior portion of one or more containers, such as a handle of the container 384A, may be within the camera field of view 353. As discussed below in more detail, the robot arm 363 may in some embodiments be configured to grip and pull the handle of, e.g., the container 384A so as to slide the container 384A (e.g., via rails 382A, 383A of FIG. 3A) to an opened position.

FIG. 3C depicts the container 384A in an opened position (also referred to as an open position). When the container 384A is in the opened position, its content is accessible by the robot 361, or more specifically by the robot arm 363. For example, the container 384A may be slid via rails 382A, 383A to a location at which some or all of a bottom inner surface of the container 382A is exposed to an environment outside the housing 381 of the cabinet 380. In such a situation, at least a portion of the bottom inner surface may be in a camera field of view 353 of the spatial structure sensing camera 351 (and/or a field of view of the object identifier sensing device). Further, the content of the container 384A, such as the objects 371, 373 disposed on the bottom inner surface of the container 384A, may also be within the camera field of view 353 when the container 384A is in the opened position. As stated above, the spatial structure sensing camera 351 may be configured to generate spatial structure information which describes the container 384A and/or the objects 371, 373 contained therein. The spatial structure information may be used to detect a pose of the objects 371, 373, and to facilitate interaction between the robot arm 363 and the objects 371, 373, such as an interaction in which the end effector 363D of the robot arm 363 picks up the objects 371, 373 and moves them away from the container 384A.

Figure 3D:
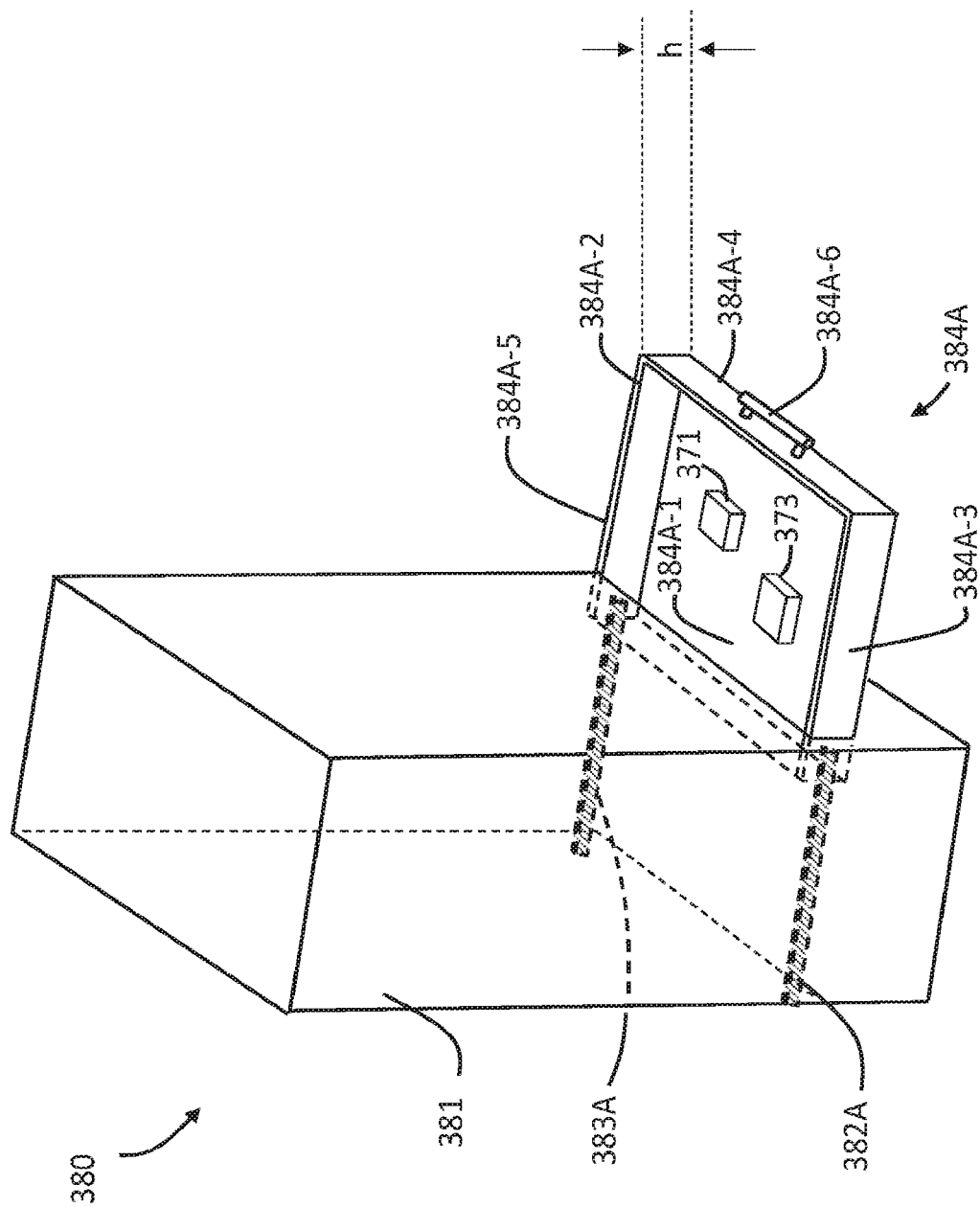

FIG. 3D provides a view of the container 384A of FIGS. 3A-3C. As illustrated in FIG. 3D, the container 384A may in an embodiment have a surface 384A-1 (also referred to as container surface 384A-1) on which one or more objects, such as objects 371, 373, are disposed within the container 384A. For instance, the container surface 384A-1 may be a bottom inner surface of the container 384A. In an embodiment, the container 384A may have a rim 384A-2 (also referred to as a container rim 384A-2) that is offset from the container surface 384A-1. The container rim 384A-2 may be formed by one or more sidewalls 384A-3, 384A-4, and 384A-5, which may each have a common height h (as depicted in FIG. 3D), or different respective heights. In this example, the container rim 384A-2 may include a top surface of the one or more sidewalls 384A-3, 384A-4, and 384A-5. The container rim 384A-2 and the container surface 384A-1 may be separated by a distance that is equal to or based on the height h, which may be a known value that the computing system 101 is configured to receive or determine. In some cases, the computing system 101 of FIGS. 3A-3C may determine information describing the container surface 384A-1 and/or the container rim 384A-2, and use that information to determine additional information which describes one or more objects (e.g., 371, 373) disposed within the container 384A, as discussed below in more detail. As further depicted in FIG. 3D, the container 384A may in some instances include a handle 384A-6. The computing system 101 may in some embodiments be configured to cause the robot arm 363 (of FIGS. 3A-3C) to move the container 384A to an opened position by pulling on or otherwise interacting with the handle 384A-6.

Figure 4:
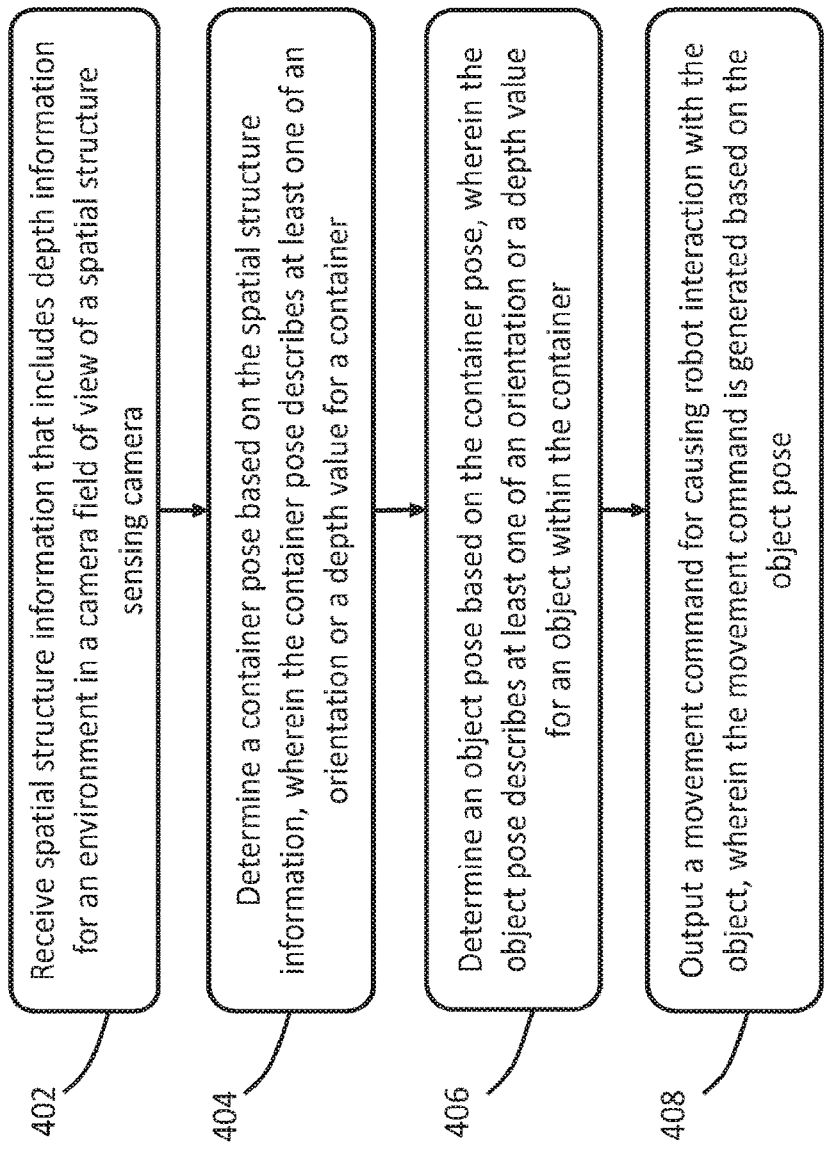
FIG. 4 provides a flow diagram that illustrates a method of determining information about an object disposed within a container, according to an embodiment hereof.

FIG. 4 depicts a flow diagram for a method 400 for facilitating robot interaction with an object that is contained in a container. The method 400 may involve determining information describing how the object is arranged in space, so that a robot can move in an appropriate manner to, e.g., grip the object. In one example, the information may describe a pose of the object (also referred to as object pose), which may describe at least one of an orientation or a depth value for the object (e.g., relative to spatial structure sensing camera 351 of FIGS. 3A-3C). As discussed below in more detail, the method 400 may determine how the object is arranged in space based on information which describes how the container (e.g., 384A) is arranged in space. In an embodiment, the method 400 may be performed by the computing system 101, or more specifically by the processing circuit 110. In some cases, the method 400 may be performed when the processing circuit 110 executes instructions stored on the non-transitory computer-readable medium 120 of FIGS. 2A-2C.

In an embodiment, the method 400 may begin in a scenario in which a container (e.g., 384A) is in a closed position, and may involve the computing system 101 controlling a robot (e.g., 361) to move the container to an opened position, as discussed below in more detail. Such a movement may involve, e.g., the container 384A being slid along rails 382A, 383A, which are illustrated in FIGS. 3A and 3C. As discussed with respect to FIGS. 3A and 3C, the rails 382A, 383A may in an embodiment be attached to an inner side surface of the housing 381 in which the container 384A is housed, and may allow the container 384A to slide into and out of the housing 381.

Figure 5A:
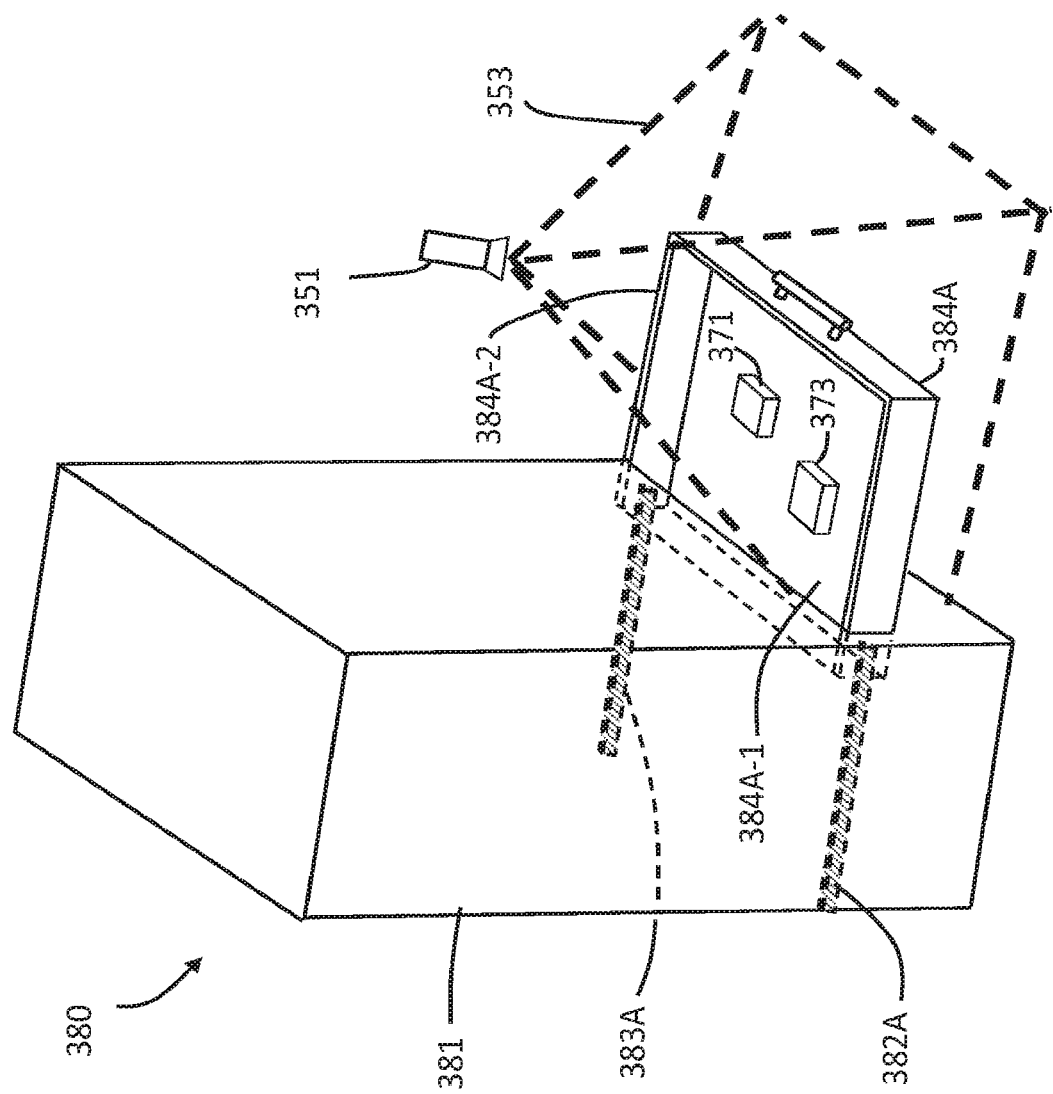
FIGS. 5A-5C illustrate a container and objects within the container, according to an embodiment hereof.

In an embodiment, the method 400 may begin in a scenario in which the container (e.g., 384A) is or has already been in an opened position, such as that illustrated in FIGS. 3C and 5A. Similar to the example in FIG. 3C, the container 384A in FIG. 5A contains objects 371 and 373, which are disposed within the container 384A, and more specifically are disposed on a container surface 384A-1 of the container 384A. Because the container 384A is in the opened position, the objects 371, 373 within the container 384A may be within the camera field of view 353 of the spatial structure sensing camera 351.

In an embodiment, the method 400 may include a step 402, in which the computing system 101 receives spatial structure information generated by a spatial structure sensing camera (e.g., 351 of FIG. 5A). The spatial structure information may include depth information for an environment in the camera field of view 353. More particularly, the spatial structure information may describe how various structures in the camera field of view 353 are spatially arranged (that is, how they are arranged in space). The various structures may include, e.g., the container 384A and the objects 371, 373 disposed within the container 384A.

Figure 5B:
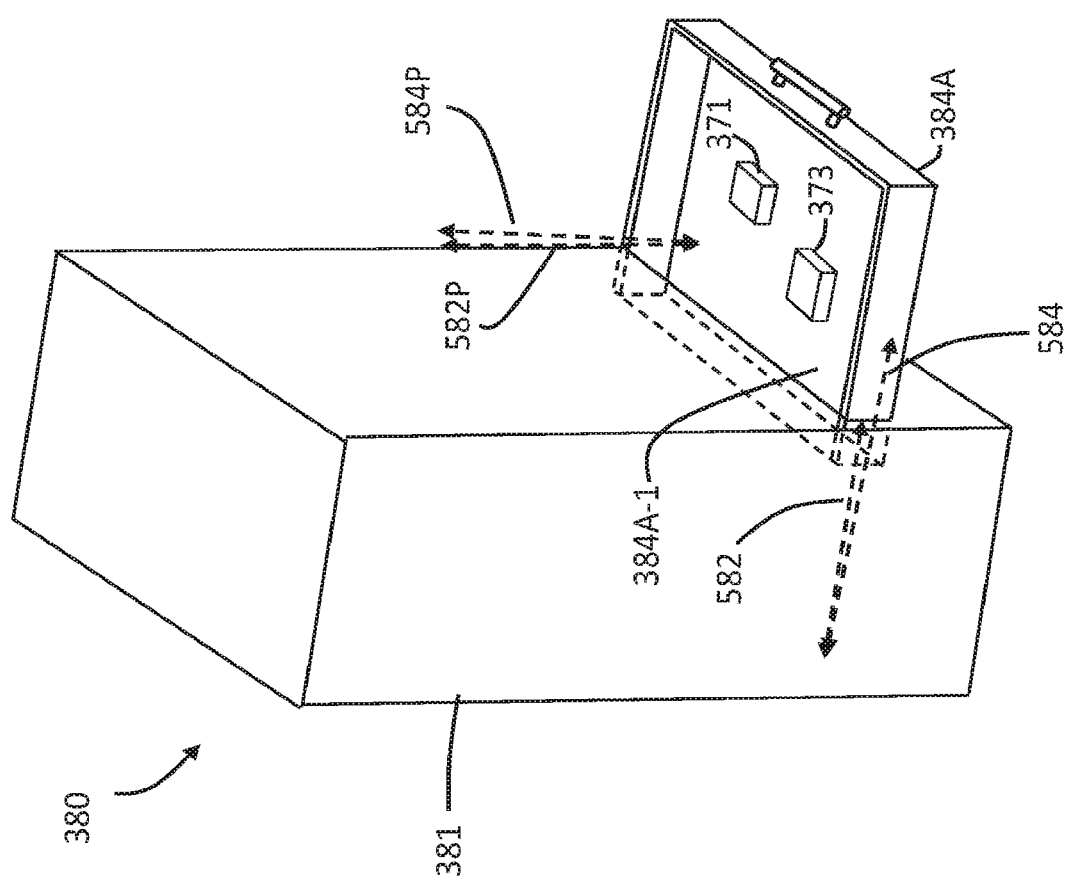

In an embodiment, the spatial structure information may be used to detect tilting of one or more structures, or more specifically an amount of tilt and/or tilt orientation. More specifically, the container 384A may have one or more links, such as the rails 382A, 383A, which attach the container 384A to a housing 381. As the container 384A is moved toward the opened position, it may tilt downward relative to the one or more links and relative to the housing 381. For instance, as the container 384A slides along the rails 382A, 383A in FIG. 5A from a closed position to an opened position, the container 384A's weight may cause it to tilt downward relative to the rails 382A, 383A. An example of the tilting is illustrated in FIG. 5B. More particularly, FIG. 5B depicts an axis 582 which represents an orientation of the rails 383A, 383A of FIG. 5A, and is more specifically parallel with the rails 382A, 383A. The figure further depicts another axis 582P which is perpendicular to the axis 582. In some cases, the axis 582P may be parallel with a vertical wall of a housing 381 for the cabinet 380. FIG. 5B further depicts an axis 584 and axis 584P which may both represent an orientation of the container 384A. More specifically, the axis 584 may be parallel with the container 384A, or more specifically parallel with the container surface 384A-1. The axis 584P may be a normal axis for the container surface 384A-1, and may be perpendicular to the axis 584. When the container 384A is in the closed position, the axis 584 associated with the container 384 may be parallel with the axis 582 associated with the rails 382A, 383A. Further, the axis 584P may be parallel with the axis 582P. As discussed above, when the container 384A slides from the closed position to the opened position, the container 384A may tilt downward, causing the axis 584 associated with the container 384A to deviate from the axis 582, and causing the normal axis 584P to deviate from the axis 582P, as depicted in FIG. 5B. In other words, the axis 584 may become oblique to the axis 582, and the axis 584P may become oblique to the axis 582P.

In an embodiment, the tilting of the container 384A may cause the container 384A and any object (e.g., object 371 or 373) within the container 384A to shift in depth and/or orientation relative to, e.g., the robot arm 363 and/or the spatial structure sensing camera 351 of FIGS. 3A-3C. For instance, if the container 384 did not tilt downwards when it is in the opened position, the objects 371, 373 may have a first depth value and first orientation relative to the spatial structure sensing camera 351 and/or to the robot arm 363. The tilting of the container 384A may cause the objects 371, 373 to have a second depth value and second orientation relative to the spatial structure sensing camera 351 and/or to the robot arm 363. In some cases, the second depth value may be larger than the first depth value by only a few millimeters, and the second orientation may be different from the first orientation by only a few degrees or a fraction of a degree, but such a difference may be sufficient to affect an ability of the robot arm 363 to grip or otherwise interact with the objects 371, 373 in an accurate manner, especially if the computing system 101 is assuming that the objects 371, 373 are arranged in space according to the first depth value or the first orientation. Further, the computing system 101 may need to determine how the objects 371, 373 are arranged in space, with millimeter-level accuracy or better, so as to ensure proper interaction between the robot 361 of FIGS. 3A-3C and the objects 371, 373.

In some cases, an amount or effect of the tilting may be difficult to predict with millimeter-accuracy because there may be multiple degrees of freedom for the container (e.g., 384A) as it moves from the closed position to the opened position. Thus, one aspect of the present application relates to using spatial structure information, such as that received in step 402 of method 400, to determine how an object (e.g., 371/373) is arranged in space, so as to facilitate an ability to control the robot arm 363 to correctly interact with the object (e.g., 371/373).

Figure 5C:
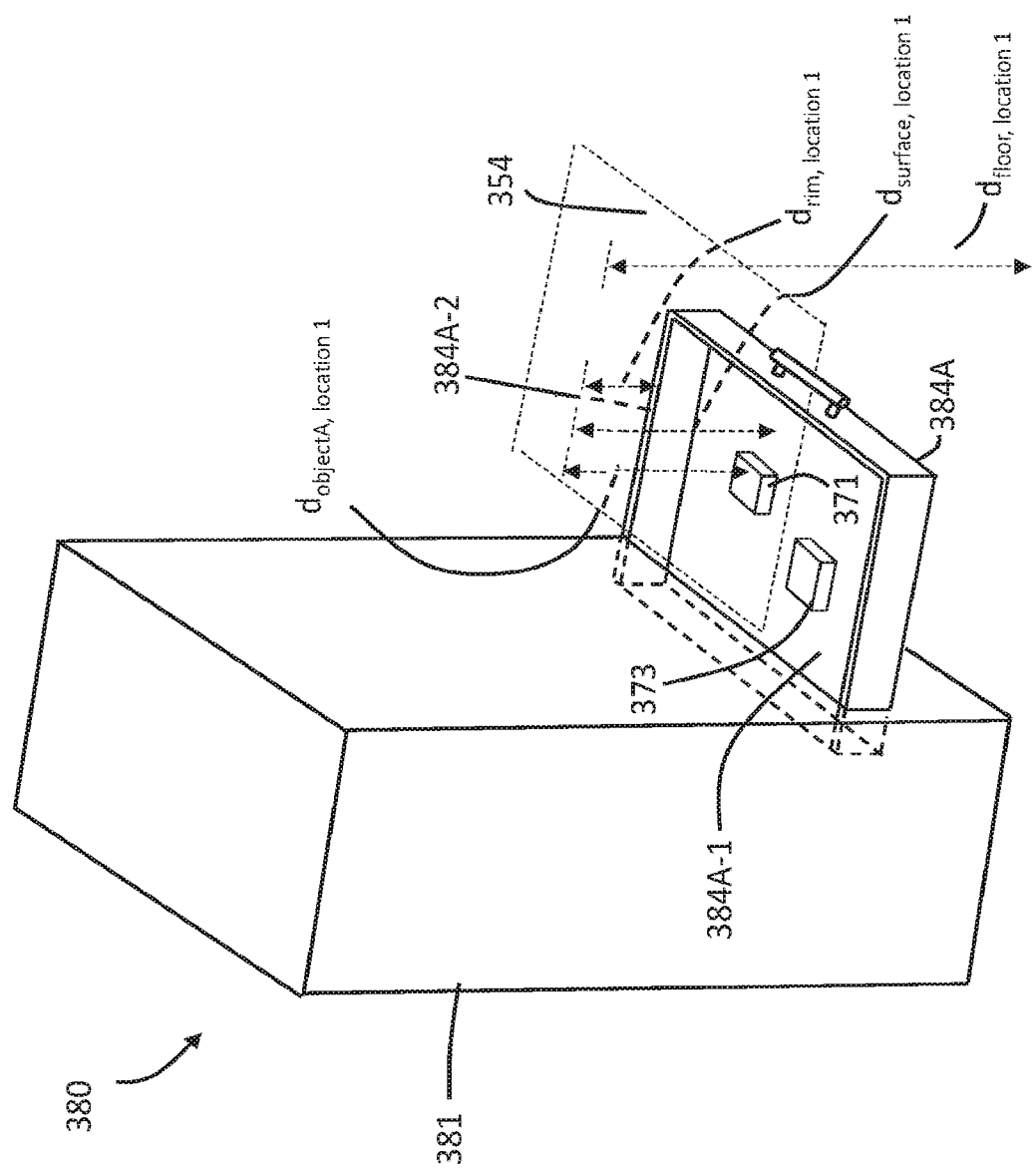

As stated above, the spatial structure information of step 402 may include depth information for the environment in the camera field of view (e.g., 353). The depth information may include one or more depth values, each of which may indicate a depth of a particular location in the camera field of view 353 relative to the spatial structure sensing camera (e.g., 351), or relative to some other reference point or reference frame. In some cases, the location associated with the depth value may be a location on a surface of a structure in the camera field of view 353. For example, FIG. 5C illustrates depth information that includes depth values $d_{objectA,\ location1}$; $d_{rim,\ location1}$; $d_{surface,\ location1}$; and $d_{floor,\ location1}$. In this example, the depth value $d_{objectA,\ location1}$ may indicate a depth value for a location on the object 371, relative to the spatial structure sensing camera 351, or more specifically relative to an image plane 354 formed by an image sensor or other sensor of the spatial structure sensing camera 351. More specifically, the depth value $d_{objectA,\ location1}$ may indicate a distance between the location on the object 371 (e.g., on a surface of the object 371) and the image plane 354. This distance may be measured along an axis perpendicular to the image plane 354. In an embodiment, the depth information may include one or more respective depth values for one or more portions of the container, such as the container surface 384A-1 and the container rim 384A-2. For example, depth value $d_{surface,\ location1}$ may indicate a depth value for the container surface 384A-1, or more specifically for a location on the container surface 384A-1. The depth value $d_{rim,\ location1}$ may indicate depth value for the container rim 384A-2 relative to the image plane 354, or more specifically for a location on the container rim 384A-2. Additionally, the depth value $d_{floor,\ location1}$ may indicate a depth value for a floor or other surface on which the housing 381 of the cabinet 380 is disposed, or more specifically for a location on the floor.

Figure 6A:
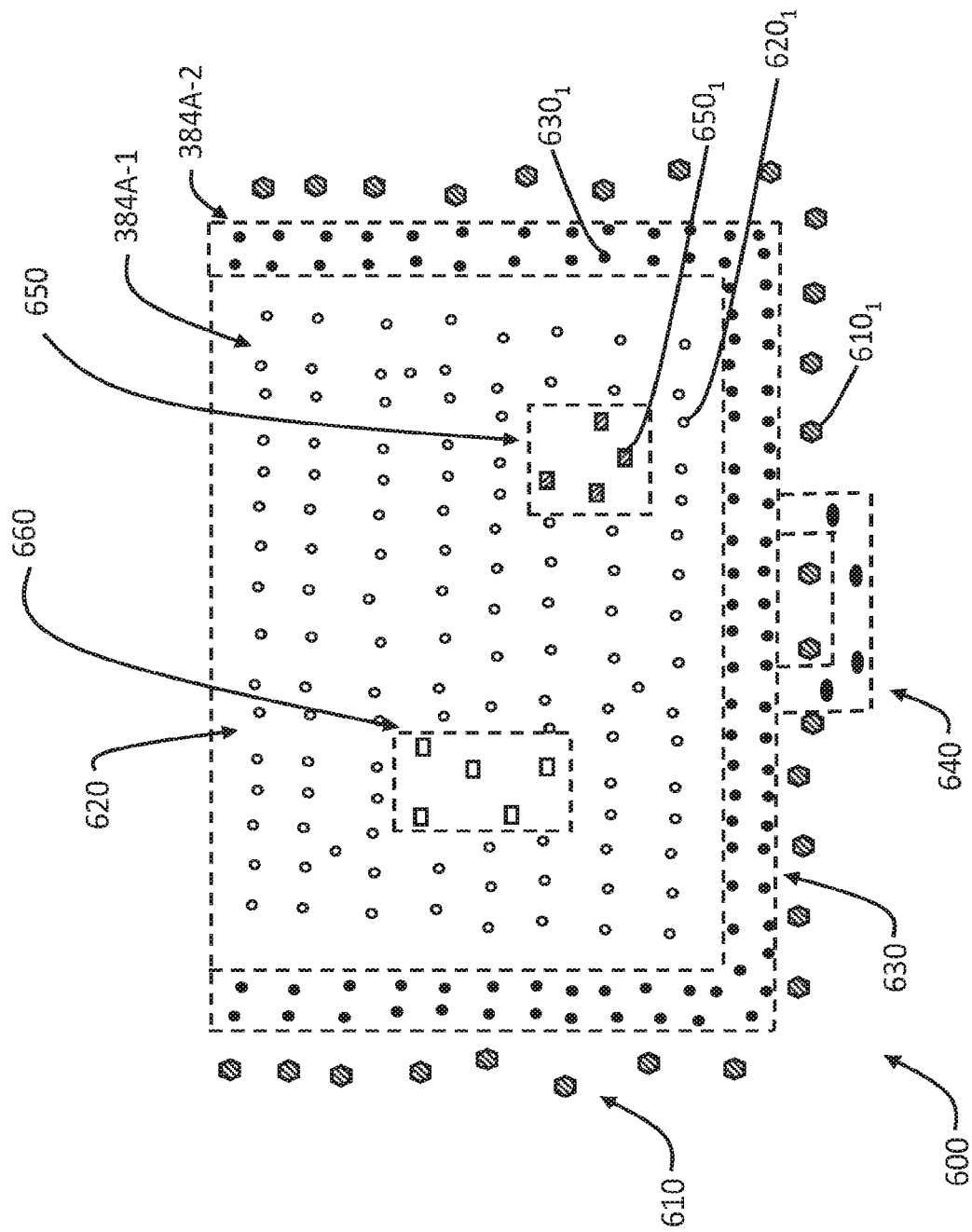
FIGS. 6A-6C illustrate spatial structure information that describes a container or objects disposed within the container, according to an embodiment hereof.

FIG. 6A depicts a representation of the spatial structure information received in step 402. In this example, the spatial structure information may include or may identify a plurality of depth values for a plurality of locations, respectively, in a camera field of view (e.g., 353). More particularly, the figure illustrates various sets 610-660 of locations (also referred to as points) for which the spatial structure information identifies respective depth values. The set 610 of locations (identified as striped hexagons) may correspond to a floor or other surface on which the housing 381 of FIG. 5C is disposed. For example, the set 610 may include location $610_1$, which may correspond to the depth value $d_{floor, location1}$ of FIG. 5C. The set 620 of locations (identified as white circles) may belong to the container surface 384A-1 (e.g., bottom inner surface) of the container 384A. For example, the set 620 may include location $620_1$, which may correspond to the depth value $d_{surface, location1}$ of FIG. 5C. The set 630 of locations (identified as dark circles) may belong to the container rim 384A-2. For instance, the set 630 may include location $630_1$, which may correspond with the depth value $d_{rim, location1}$ of FIG. 5C. The set 640 of locations (identified as dark ellipses) may belong to the handle 384A-6 of the container 384A. Further, the set 650 of locations (identified as shaded rectangles) may belong to the object 371 of FIG. 5C. For example, the set 650 may include location $650_1$, which may correspond to the depth value $d_{objectA, location1}$ of FIG. 5C. Additionally, the set 660 of locations (identified as white rectangles) may belong to the object 373 of FIG. 5C.

In an embodiment, the spatial structure information may include a depth map and/or a point cloud. The point cloud may include, e.g., respective coordinates of locations on one or more structures in the camera field of view (e.g., 353) of the spatial structure sensing camera (e.g., 351). For example, the point cloud may include 3D coordinates, such as [x y z] coordinates in a reference frame (e.g., coordinate system) of the spatial structure sensing camera or some other reference frame. In such an example, a coordinate for a location may indicate a depth value for the location. For example, the depth value for the location may be equal to or based on a z-component of the coordinate.

In an embodiment, the spatial structure information may be affected by or include measurement error or other error. For instance, the location $650_1$ may have a depth value that is equal to $d_{objectA, location1}$, but the point cloud or other spatial structure information may indicate that location $650_1$ on object 371 has a [x y z] coordinate in which $z = d_{objectA, location1} + \varepsilon_{objectA, location1}$, in which $\varepsilon_{objectA, location1}$ refers to error associated with the location $650_1$. In that situation, the spatial structure information may erroneously indicate that the location $650_1$ has the depth value $d_{objectA, location1} + \varepsilon_{objectA, location1}$. The error may be due to, e.g., imaging noise or some other source of error. The error may be based on a variety of factors. In some instances, the object 371 or other structure may have a shape that interferes with a principle of operation of the spatial structure sensing camera (e.g., 351). In some cases, the object 371 may be formed from a material (e.g., transparent or translucent material) that interferes with the principle of operation of the spatial structure sensing camera. In some cases, light or other signals may reflect off another object 373 (of FIG. 5C) or an inner surface of the container 384A, and such reflected signal from the other object 373 may act as imaging noise which interferes with an ability of the spatial structure sensing camera (e.g., 351) to accurately measure a depth value for the object 371.

Figure 6B:
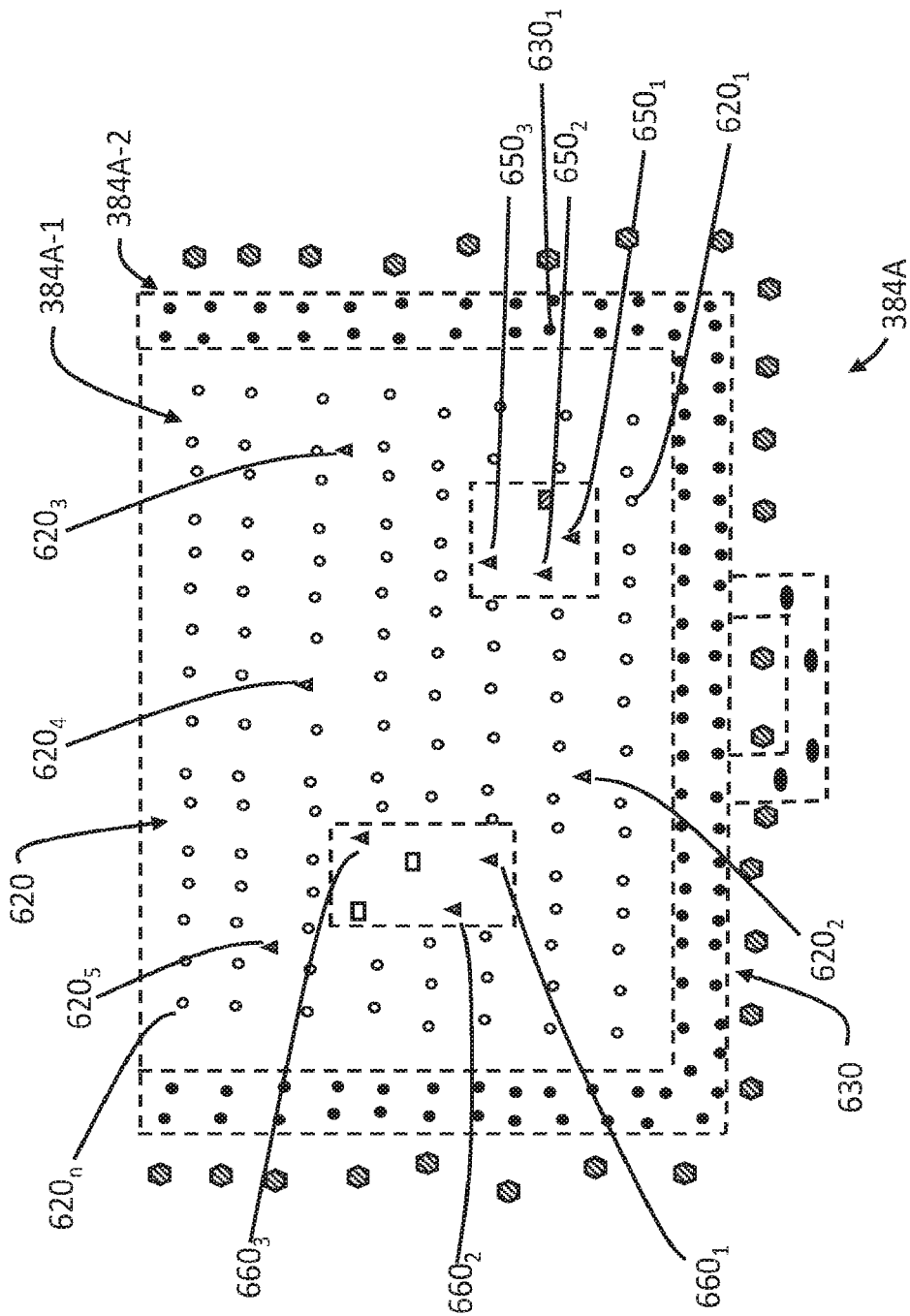

FIG. 6B provide examples of locations (represented with shaded triangles) that correspond to a portion of the spatial structure information substantially affected by noise or other source of error. In the example of FIG. 6B, locations $620_2$ through $620_5$ of the set 620 of locations (corresponding to the container surface 384A-1) may be substantially affected by noise, and the spatial structure information corresponding to those locations may include a considerable amount of error. Further, locations $650_1$ through $650_3$ of the set 650 of locations (which corresponds to the object 371) and locations $660_1$ through $660_3$ of the set 660 of locations (which corresponds to object 373) may be substantially affected by noise, and the spatial structure information corresponding to those locations may also include a considerable amount of error. In such an example, determining how the object 371 or the object 373 are arranged in space by directly using the spatial structure information for the set 650 of locations or the set 660 of locations may lead to an inaccurate or otherwise unreliable result, because a substantial percentage of those locations may be affected by noise or other source of error. Thus, one aspect of the present disclosure relates to determining how the container (e.g., 384A) is arranged in space, and determining how an object (e.g., 371/373) within the container (e.g., 384A) is arranged in space based on how the container is arranged in space.

Returning to FIG. 4, the method 400 may in an embodiment include a step 404, in which the computing system 101 determines a container pose based on the spatial structure information. In some implementations, step 404 may be performed by the container detection module 202 of FIG. 2C. In an embodiment, the container pose may refer to a pose of a container, such as the container 384A, and may be used to describe at least one of an orientation of the container (e.g., 384A) or a depth value for at least a portion of the container (e.g., 384A). In some cases, the portion of the container (e.g., 384A) may refer to a component of the container, such as the container rim (e.g., 384A-2) or the container surface (e.g., 384A-1). In some cases, the portion of the container (e.g., 384A) may refer to a region on the container, or more generally to a location (e.g., $620_1$ or $630_1$ of FIG. 6A) on a surface of the container, such as the container surface (e.g., 384A-1) on which container content is disposed or a surface of the container rim (e.g., 384A-2).

In some cases, the container pose may describe a posture or disposition of the container (e.g., 384A), or more generally describe how the container (e.g., 384A) is arranged in 3D space. For example, the container pose may describe an orientation of the container (e.g., 384A), which may describe an amount (if any) by which the container (e.g., 384) or a portion thereof is tilting downward. As stated above, the container pose may describe a depth value, which may indicate, e.g., how far the container (e.g., 384A) or a portion thereof is from the spatial structure sensing camera (e.g., 351 of FIGS. 3A-3C) or from a robot arm (e.g., 363) or other portion of a robot (e.g., 361).

In some cases, the container pose may describe both an orientation of the container and a depth value for a location (e.g., $620_1$ or $630_1$) on the container (e.g., 384A). The depth value may be equal to or indicate, e.g., a component of a 3D coordinate for that location. For instance, the 3D coordinate may be a [x y z] coordinate that includes a 2D component or 2D coordinate (e.g., a [x y] coordinate) and a depth component (e.g., z-component or z coordinate). The z-component or z coordinate may be equal to or based on the depth value for that location, relative to the spatial structure sensing camera (e.g., 351) or some other reference frame. In such an example, the container pose may describe both an orientation of the container and a 3D coordinate for a location on the container.

In an embodiment, the container pose determined in step 404 may be a container surface pose, which may be a pose of a container surface (e.g., 384A-1). The container surface may be, e.g., a bottom inner surface or other surface on which an object or other content of the container (e.g., 384A) is disposed within the container. The container surface pose may describe, e.g., at least one of: an orientation of the container surface (e.g., 384A-1) or a depth value for at least one location (e.g., 620$_1$) of or on the container surface (e.g., 384A-1).

In an embodiment, determining the container surface pose may involve directly using a portion of the spatial structure information corresponding to locations on the container surface (e.g., 384A-1). For example, the computing system 101 in an embodiment may determine the container surface pose directly based on spatial structure information corresponding to the set 620 of locations of FIG. 6B, which may include locations 620$_1$ through 620$_n$. The corresponding spatial structure information may include, e.g., respective depth values for locations 620$_1$ through 620$_n$. In some cases, the computing system 101 may be configured to identify the locations 620$_1$-620$_n$ as belonging to the container surface (e.g., 384A-1), or more generally as belonging to a common layer, so as to distinguish these locations from those locations representing other layers in a camera field of view (e.g., 353). For instance, the computing system 101 may be configured to identify the locations 620$_1$ through 620$_n$ as having respective depth values which are substantially continuous, with no sharp discontinuity among them. In some cases, the computing system 101 in this embodiment may determine the container surface pose by determining a plane which best fits through all or some of the locations 620$_1$ through 620$_n$. The computing system 101 may determine an orientation for the container surface (e.g., 384A-1) to be equal to or based on a characteristic of the plane, such as its slope or normal vector. In some cases, the computing system 101 may estimate or otherwise determine a depth value for a location on the container surface (e.g., 384A-1) based directly on the spatial structure information. For example, if the spatial structure information provides a 3D coordinate for that location, such as a [x y z] coordinate, the depth value may be equal to or based on a z-component of the 3D coordinate. In some cases, the computing system 101 may use the plane to estimate a depth value for a location on the container surface (e.g., 384A-1), because that location may fall on or be substantially close to the plane. For instance, if the computing system 101 receives a 2D component (e.g., [x y] component) for a location on the container surface (e.g., 384A-1), it may be configured to determine a 3D coordinate belonging to the plane which also has the 2D component. In such an example, the 3D coordinate on the plane may indicate or approximate the location on the container surface (e.g., 384A-1). Thus, a z-component of the 3D coordinate on the plane may be equal to or approximate a depth value for the location on the container surface (e.g., 384A-1).

In an embodiment, determining the container surface pose may involve indirectly using spatial structure information corresponding to another portion of the container (e.g., 384A), such as spatial structure information corresponding to the container rim (e.g., 384A-2). More particularly, an embodiment of step 404 may involve determining a container rim pose, and determining the container surface pose based on the container rim pose. The container rim pose may describe at least one of an orientation of the container rim (e.g., 384A-2) or a depth value for at least one location (e.g., 630$_1$) on the container rim (e.g., 384A-2).

In some cases, determining the container surface pose based on the container rim pose may provide a determination that is more robust against noise or other source of error.

Figure 6C:
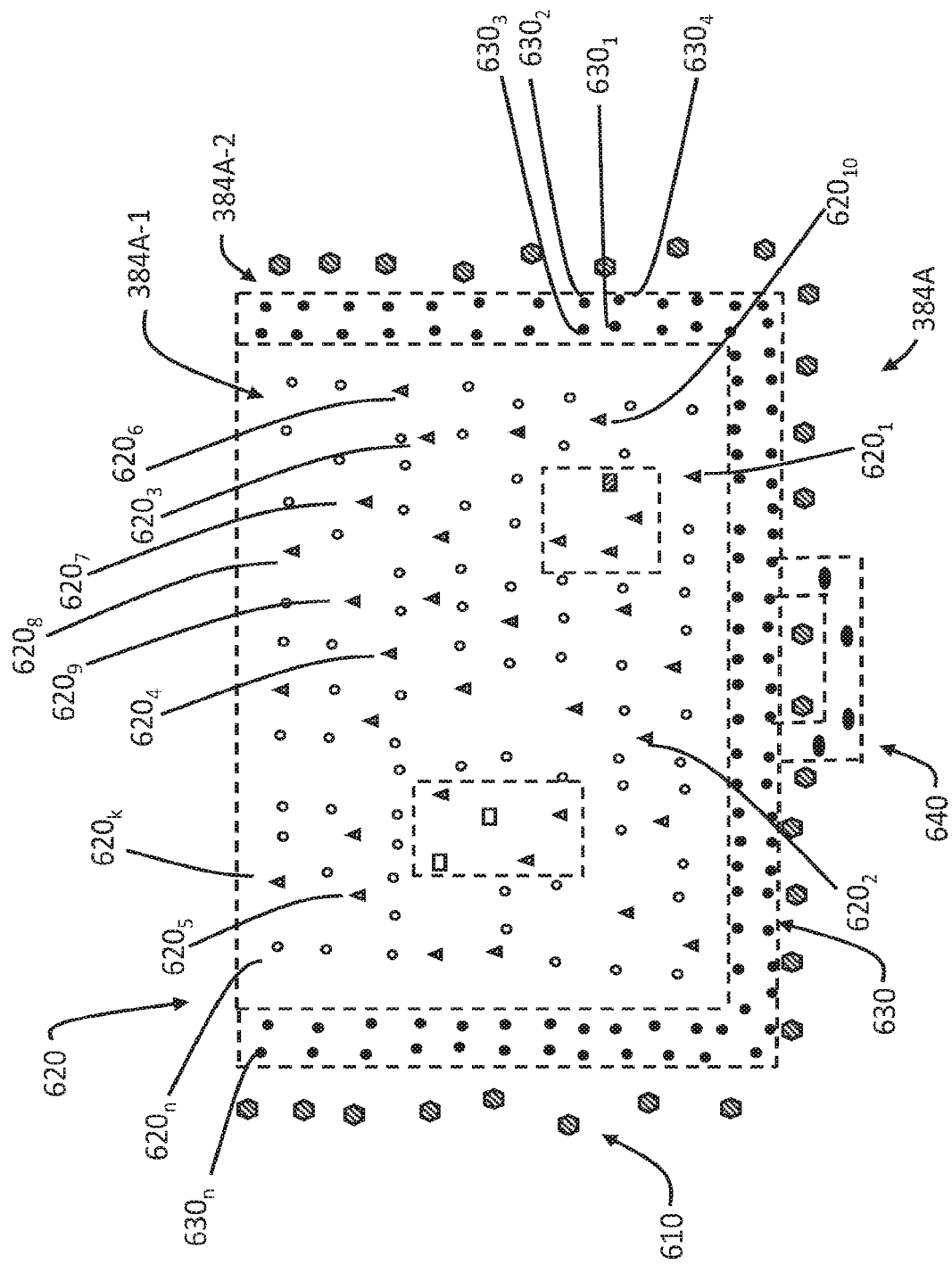

More specifically, noise may affect not only locations (e.g., 650$_1$ through 650$_3$) on an object (e.g., 371) disposed within a container (e.g., 384), but may also affect locations on the container surface (e.g., 384A-1) on which the object is disposed. Thus, depth information or other spatial structure information corresponding to those locations may be unreliable. For instance, FIG. 6C illustrates a scenario in which locations 620$_2$, 620$_3$, 620$_4$, 620$_5$, 620$_6$, 620$_7$, 620$_8$, 620$_9$, 620$_{10}$, ... 620$_k$ on the container surface 384A-1 (which may be a subset of all of the locations 620$_1$ through 620$_n$ identified by the spatial structure information) are affected by imaging noise, which may introduce error into a corresponding portion of the spatial structure information for those locations, and more particularly introduce error into depth information for those locations. While FIG. 6B also illustrates an example having noise (at locations 620$_2$ through 620$_6$), FIG. 6C illustrates an example of a much noisier environment at the container surface 384A-1. In the example of FIG. 6C, the locations affected by noise (620$_2$ through 620$_k$) may be a large percentage of all locations (620$_1$ through 620$_n$) for which spatial structure information is available. The noise may arise from, e.g., presence of signals reflecting off the container surface (e.g., 384A-1) or reflecting off an object (e.g., 371/373) on the container surface (e.g., 384A-1), wherein the reflected signals may interfere with each other and interfere with direct measurement of depth values for locations on the container surface (e.g., 384A-1).

Figure 6D:
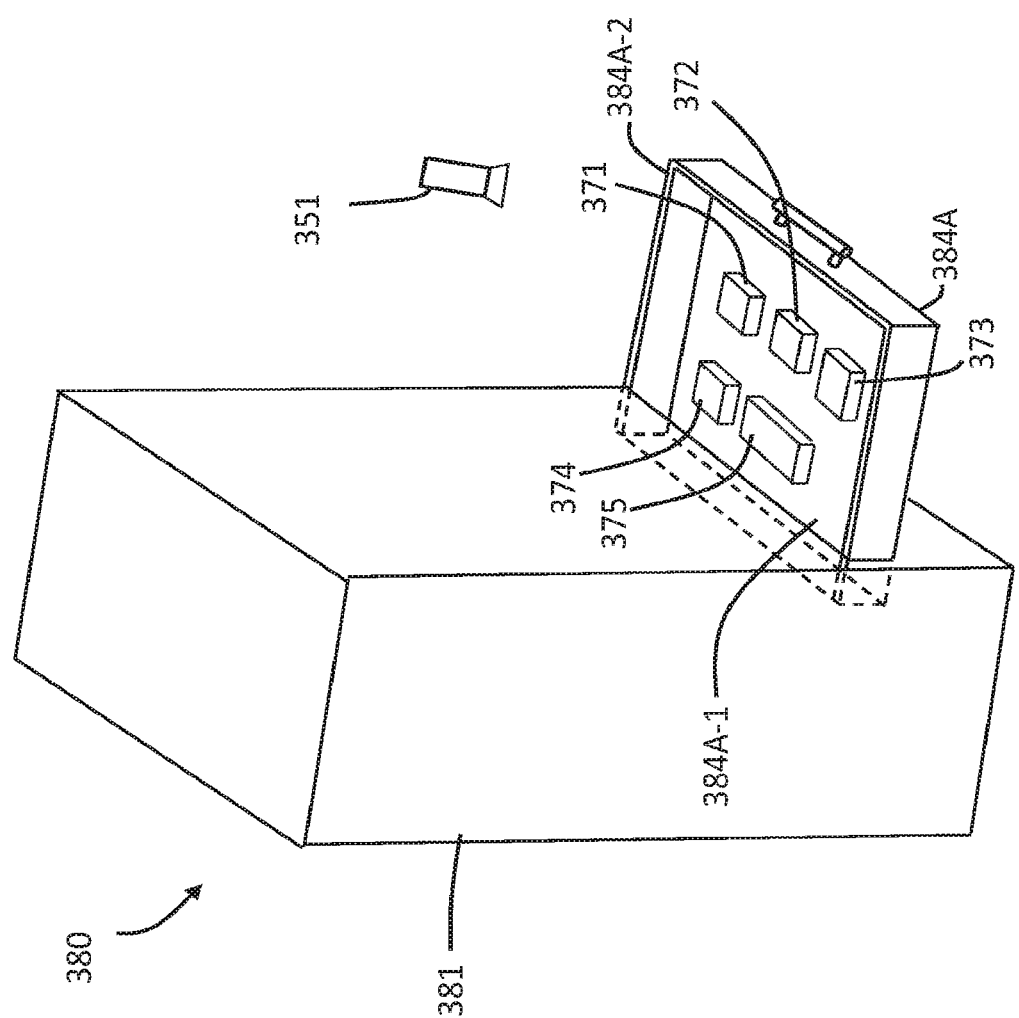
FIG. 6D illustrate a container and objects disposed within the container, according to an embodiment hereof.
Figure 6E:
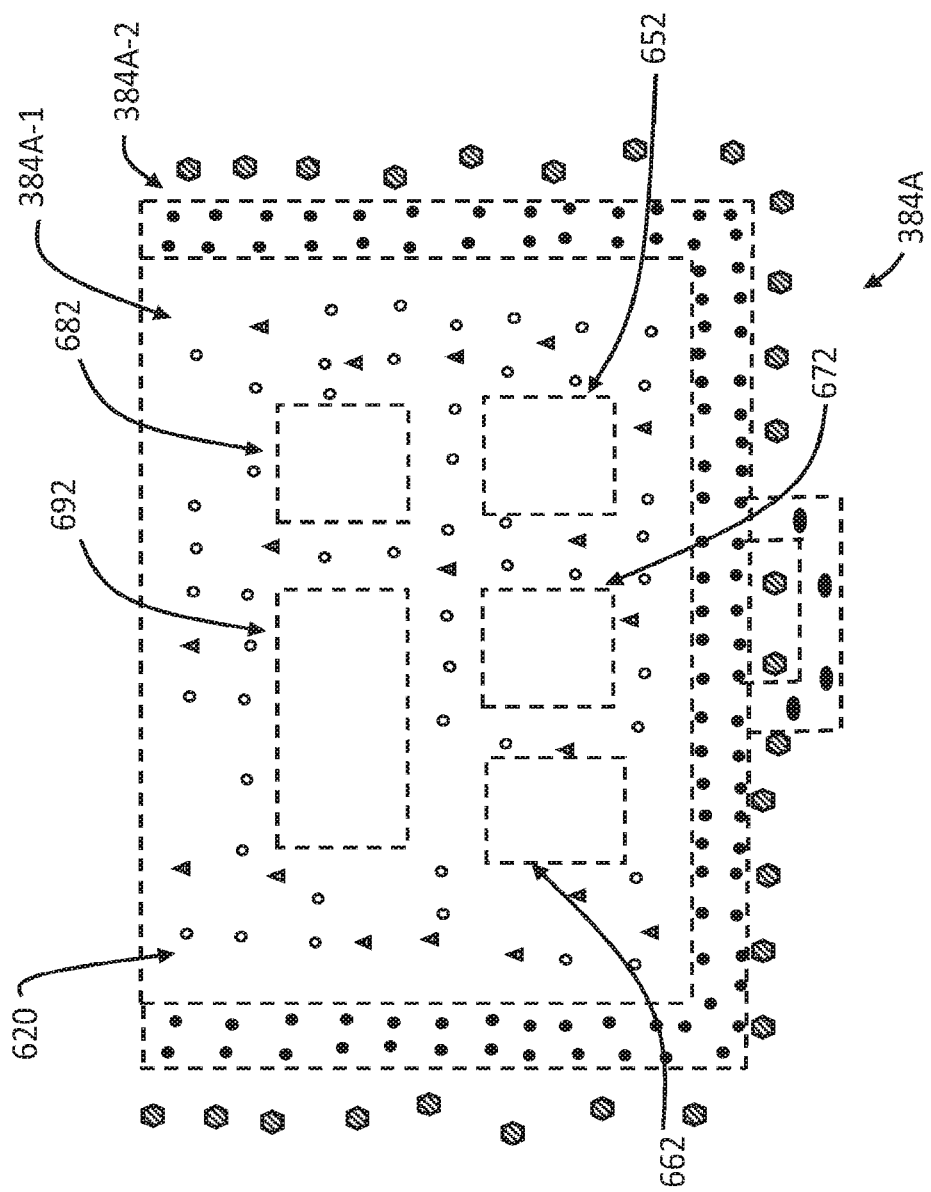
FIG. 6E illustrates spatial structure information that describes a container or objects disposed within the container, according to an embodiment hereof.

In some cases, a crowded container (i.e. a container that includes a number of objects that may obscure the container surface) may also interfere with direct measurement of depth values for locations on the container surface (e.g., 384A-1). For example, FIG. 6D depicts a scenario in which many objects, such as objects 371-375, are disposed on the container surface 384A-1. The objects 371-375 may cover a large portion of the container surface 384A-1. More specifically, FIG. 6E illustrates spatial structure information for the example depicted in FIG. 6D. As depicted in FIG. 6E, the objects 371-375 may cover or otherwise occupy regions 652-692 on the container surface 384A-1. Although some portions of the container surface 384A-1 are not covered by the objects 371-375, those portions may still be affected by noise, thus limiting an ability to use the spatial structure sensing camera 371 to directly make accurate depth measurements for the container surface 384A-1.

Thus, one aspect of the present disclosure relates to using spatial structure information corresponding to another portion of the container, such as the container rim (e.g., 384A-2) to indirectly determine information about the container surface (e.g., 384A-1). In an embodiment, as stated above, the computing system 101 may determine a container rim pose, and use the container rim pose to determine the container surface pose. The container rim (e.g., 384A-2) may in some instances be less affected by noise or sources of measurement error. That is, these sources of measurement error may affect direct measurement of the container surface (e.g., 384A-1) or objects disposed on the container surface (e.g., 384A-1). The container rim (e.g., 384A-2), however, may be offset from the container surface (e.g., 384A-1) by one or more sidewalls of the container (e.g., sidewalls 384A-3 through 384A-5 in FIG. 3D), which may have a height h that causes the container rim (e.g., 384A-2) to be completely above the objects (e.g., 371, 373). Thus, the container rim (e.g., 384A-2) may be considerably less affected by the sources of measurement error, and direct depth measurement of the container rim (e.g., 384A-2) may be considerably more accurate than direct depth measurement of the container surface (e.g., 384A-1).

In an embodiment, the direct measurement of the container rim (e.g., 384A-2) may include spatial structure information corresponding to locations on the container rim (e.g., 384A-2), and the container rim pose may be determined based on such spatial structure information. For instance, as depicted in FIG. 6C, the spatial structure information may include depth information that indicates respective depth values for locations $630_1$, $630_2$, $630_3$, $630_4$, ... $630_n$ on the container rim (e.g., 384A-2). In some cases, the computing system 101 may be configured to distinguish these locations $630_1$-$630_n$ from locations representing another component of the container (e.g., from $620_1$ through $620_n$) by identifying the locations $630_1$-$630_n$ as having no sharp discontinuity in depth among them, and thus as belonging to a common layer separate from other layers in the camera field of view (e.g., 353). In an embodiment, the computing system 101 may be configured to identify the locations $630_1$-$630_n$ as belonging to the container rim (e.g., 384A-2) by determining an estimated region in which the container rim (e.g., 384A-2 should be located), and searching for the locations (e.g., $630_1$-$630_n$) in the estimated region. For instance, the computing system 101 may have access to defined or otherwise known information about a structure of the container (e.g., 384A) and a structure of a cabinet (e.g., 380) or housing (e.g., 381) in which the container (e.g., 384A) is located. The information may identify, e.g., a size (e.g., dimensions), physical configuration, shape, and/or geometry of the container (e.g., 384A) or of the cabinet 380. The computing system 101 may be configured to determine the estimated region based on this information. For instance, the computing system may estimate that the container rim (e.g., 384A-2) should have a depth value of about 600 mm, with a margin of error of about 10 mm. The computing system 101 may then search for the container rim (e.g., 384A-2) in an estimated region which occupies a space that has a depth value ranging from 590 mm to 610 mm.

As stated above, the container rim pose may indicate at least one of an orientation of the container rim (e.g., 384A-2) or a depth value for at least one location on the container rim (e.g., 482A-2). In an embodiment, the computing system 101 may determine an orientation for the container rim pose by determining a difference (if any) among respective depth values for some or all of the locations (e.g., $630_1$-$630_n$) on the container rim (e.g., 384A-2). For instance, if the respective depth values for the locations $630_1$-$630_n$ are the same or substantially the same the computing system 101 may determine that the container rim 384A-2 has an orientation which is substantially flat relative to the spatial structure sensing camera 351 or other reference frame. If the respective depth values change as a function of location, the computing system 101 may determine a slope representing the change. The orientation for the container rim pose may be equal to or based on the slope.

In an embodiment, the computing system 101 may determine the container rim pose by determining a plane which substantially fits through some or all of the locations (e.g., $630_1$ to $630_n$) on the container rim (e.g., 384A-2) for which spatial structure information is provided. For instance, the computing system 101 may determine a 3D coordinate (e.g., $[x_n\ y_n\ z_n]$) for each of the locations (e.g., $630_1$ to $630_n$) or a subset of the locations, wherein the 3D coordinate may include a depth component (e.g., $z_n$) derived from the spatial structure information. The computing system 101 may determine a plane which best fits through the respective 3D coordinates. For example, the plane may be represented by the equation $a(x-x_0)+b(y-y_0)+c(z\pm z_0)=0$, wherein $[x_0, y_0, z_0]$ may be a 3D coordinate for one of the locations (e.g., $630_1$) on the container rim (e.g., 384A-2), and $[x\ y\ z]$ may represent 3D coordinates for some or all of the remaining locations (e.g., $630_2$ through $630_n$) on the container rim (e.g., 384A-2). The computing system 101 may generate a set of simultaneous equations based on the above coordinates, and solve them for the coefficients a, b, c which best satisfy the simultaneous equations. In such an example, the computing system 101 may determine an orientation for the container rim pose to be equal to or based on a characteristic of the plane, such as its slope or normal vector (e.g., a vector parallel to <a b c>).

As stated above, the computing system 101 may determine the container surface pose based on the container rim pose. In some cases, such a determination may be based on a defined distance between the container rim (e.g., 384A-2) and the container surface (e.g., 384A-1). The defined distance may be, e.g., a height h of one or more sidewalls (e.g., 384A-3 through 384A-3 of FIG. 3D) forming the container rim (e.g., 384A-2). In some cases, the defined distance may be a known value that is stored on a non-transitory computer-readable medium (e.g., 120) accessible by the computing system 101.

As further stated above, the container surface pose may describe at least one of an orientation of the container surface (e.g., 384A-1) or a depth value for a location on the container surface (e.g., 384A-1). In some cases, the computing system 101 may determine the orientation for the container surface pose based on an orientation for the container rim pose. More specifically, the computing system 101 may determine an orientation for the container surface (e.g., 384A-1) to be equal to or based on an orientation for the container rim (e.g., 384A-2). Such a determination may be based on an assumption that the container rim (e.g., 384A-2) is parallel with the container surface (e.g., 384A-1).

Figure 6F:
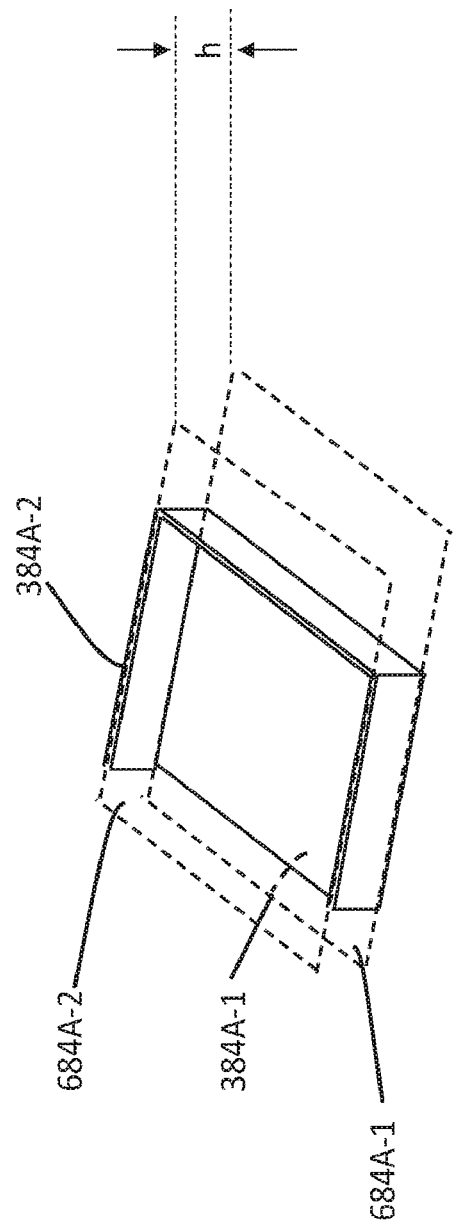
FIG. 6F illustrates a relationship between a container surface and a container rim, according to an embodiment hereof.

As an example, the computing system 101 may determine a first plane which defines an orientation for the container rim pose, as discussed above, and use the first plane to determine a second plane which defines an orientation for the container surface pose. For instance, FIG. 6F illustrates a first plane 684A-2, which may be determined based on the spatial structure information for locations (e.g., $630_1$ through $630_n$) on the container rim 384A-2, and which may define an orientation for the container rim 384A-2. The computing system 101 may be configured to determine a second plane 684A-1 based on the first plane 684A-2, wherein the second plane 684A-1 may define an orientation for the container surface 384A-1. In some instances, the first plane 684A-2 and the second plane 684A-1 may be parallel with each other and offset by the defined distance h. For instance, if the first plane 684A-2 is defined by the equation $a(x-x_0)+b(y-y_0)+c(z-z_0)=0$, as discussed above, the computing system 101 may determine the second plane 684A-1 to be defined by the equation $a(x-x_0)+b(y-y_0)+c(z-z_0-h)=0$.

In an embodiment, the computing system 101 may use the second plane 684A-1 to determine or represent respective depth values for locations on the container surface 384A-1, because locations on the container surface 384A-1 may fall on or be substantially close to the plane 684A-1. As an example, if the computing system 101 receives a 2D component or 2D coordinate (e.g., $[x\ y]$ coordinate) for a location on the container surface 384A-1, it may be configured to determine a 3D coordinate on the plane 684A-1 corresponding to this 2D component, and determine the depth value for this location based on a depth component (e.g., z-component) of the 3D coordinate. More specifically, the computing system 101 may determine a 3D coordinate [x y z] which satisfies the equation $a(x-x_0)+b(y-y_0)+c(z-z_0-h)=0$, wherein x and y may belong to the received 2D component, and wherein z may be the depth component of the 3D coordinate. Thus, the information determined from the container rim 384A-2 may be used to make a reliable determination regarding an orientation and/or depth for the container surface 384A-1.

Returning to FIG. 4, the method 400 may in an embodiment include a step 406, in which the computing system 101 determines an object pose based on the container pose. The step may be performed by, e.g., the objection detection module 204 of FIG. 2C. In this embodiment, the object pose may describe at least one of an orientation for an object (e.g., 371/373 of FIGS. 3A-3C) disposed within the container (e.g., 384A) or a depth value for at least a portion of the object. In some cases, the object may be a target object for which robot interaction is desired. The portion of the object may refer to, e.g., a location on a surface (e.g., top surface) of the object and/or a physical feature of the object, such as a corner or edge of the top surface.

In an embodiment, the container pose used to determine the object pose may be a container surface pose. For example, the computing system 101 may determine an orientation for the object pose to be equal to or based on an orientation for the container surface pose. More specifically, the computing system 101 may determine that an orientation for the object (e.g., 371) is equal to an orientation for the container surface (e.g., 384A-1).

In some cases, the computing system 101 may determine the orientation for the object (e.g., 371/373) to be based on the orientation of the container surface (e.g., 384A-1). For example, the computing system 101 may determine the orientation for the object (e.g., 371/373) to be equal to the orientation for the container surface (e.g., 384A-1) on which the object is disposed. Such a determination may be based on an assumption that the object, such as a merchandise box, is sitting flush on the container surface (e.g., 384A-1).

In some cases, the computing system 101 may determine a depth value for a location on the object (also referred to as an object location) based on a depth value for a corresponding location on the container surface (e.g., 384A-1). The corresponding location may be a location on the container surface (e.g., 384A-1) on which the object is sitting, or that more generally has the same 2D component or 2D coordinate as the object location. In some cases, the determination may be based on a defined size for the object (e.g., 371), such as a defined height $h_{object}$, which may be stored in a non-transitory computer-readable medium (e.g., 120) accessible to the computing system 101. If the object location is on a top surface of the object (e.g., 371), the computing system 101 may determine the object location as being separated from the location on the container surface (e.g., 384A-1) by the defined height $h_{object}$. For instance, if the location on the container surface (e.g., 384A-1) has the 3D coordinate [x y $z_{surface}$], the computing system 101 may determine that the object location has a 3D coordinate [x y $z_{surface} \pm h_{object}$]. In such an example, the computing system 101 may initially determine the 2D component for the object location, and use the 2D component to determine the 3D coordinate [x y $z_{surface}$], which may be determined, e.g., based on the solving the equation for the plane 684A-1, or more generally based on the container surface pose, as discussed above. The computing system 101 may then determine a depth value for the object location as being equal to or based on $z_{surface} \pm h_{object}$. Such a technique provides a robust way to accurately determine an orientation and/or depth value for the object (e.g., 371), even in an environment with a significant amount of imaging noise. Such imaging noise may prevent the spatial structure sensing camera (e.g., 351) from directly measuring depth for the object in an accurate manner. The computing system 101 may, however, make an indirect measurement by using spatial structure information for the container to determine a container surface pose, and to determine a depth value for a corresponding location on the container surface. The depth value for the object may then be extrapolated based on the depth value for the corresponding location on the container surface.

Figure 7A:
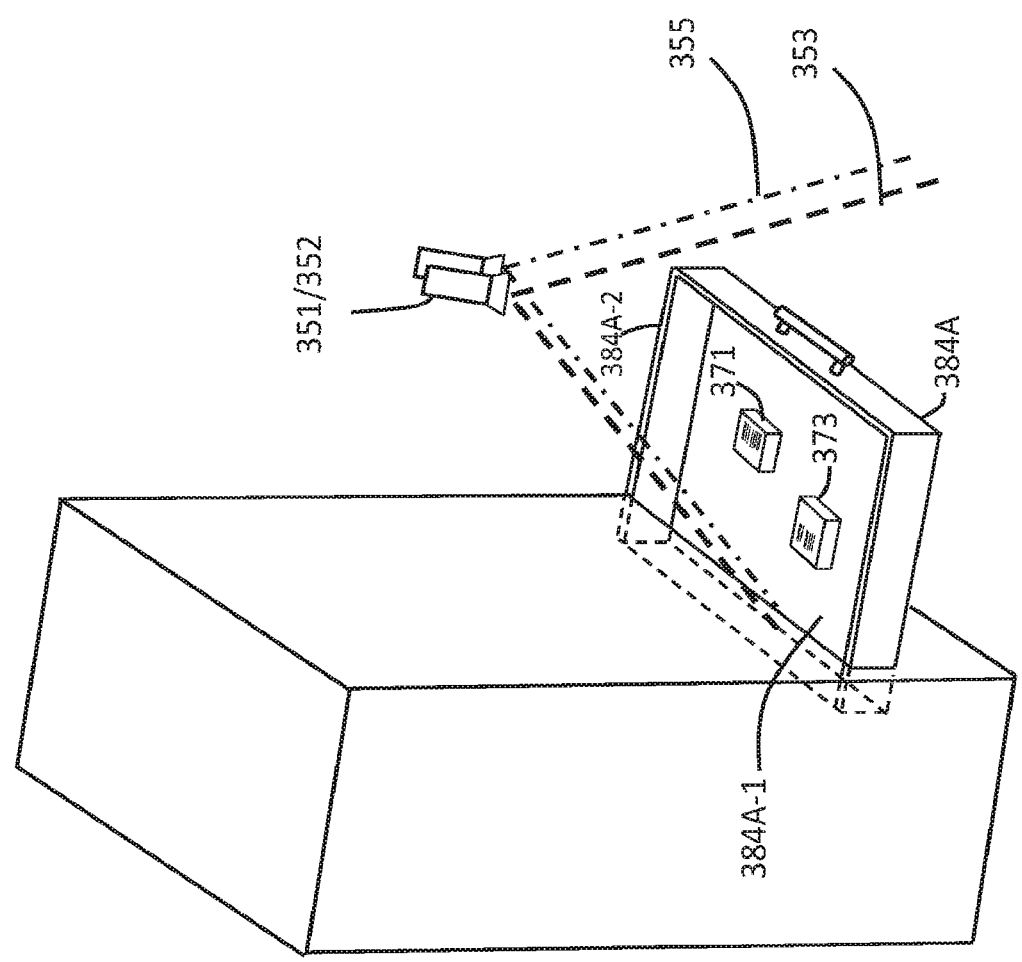
FIG. 7A depicts an environment having both a spatial structure sensing camera and an object identifier sensing device, or more specifically a barcode sensing device, according to an embodiment hereof.
Figure 7B:
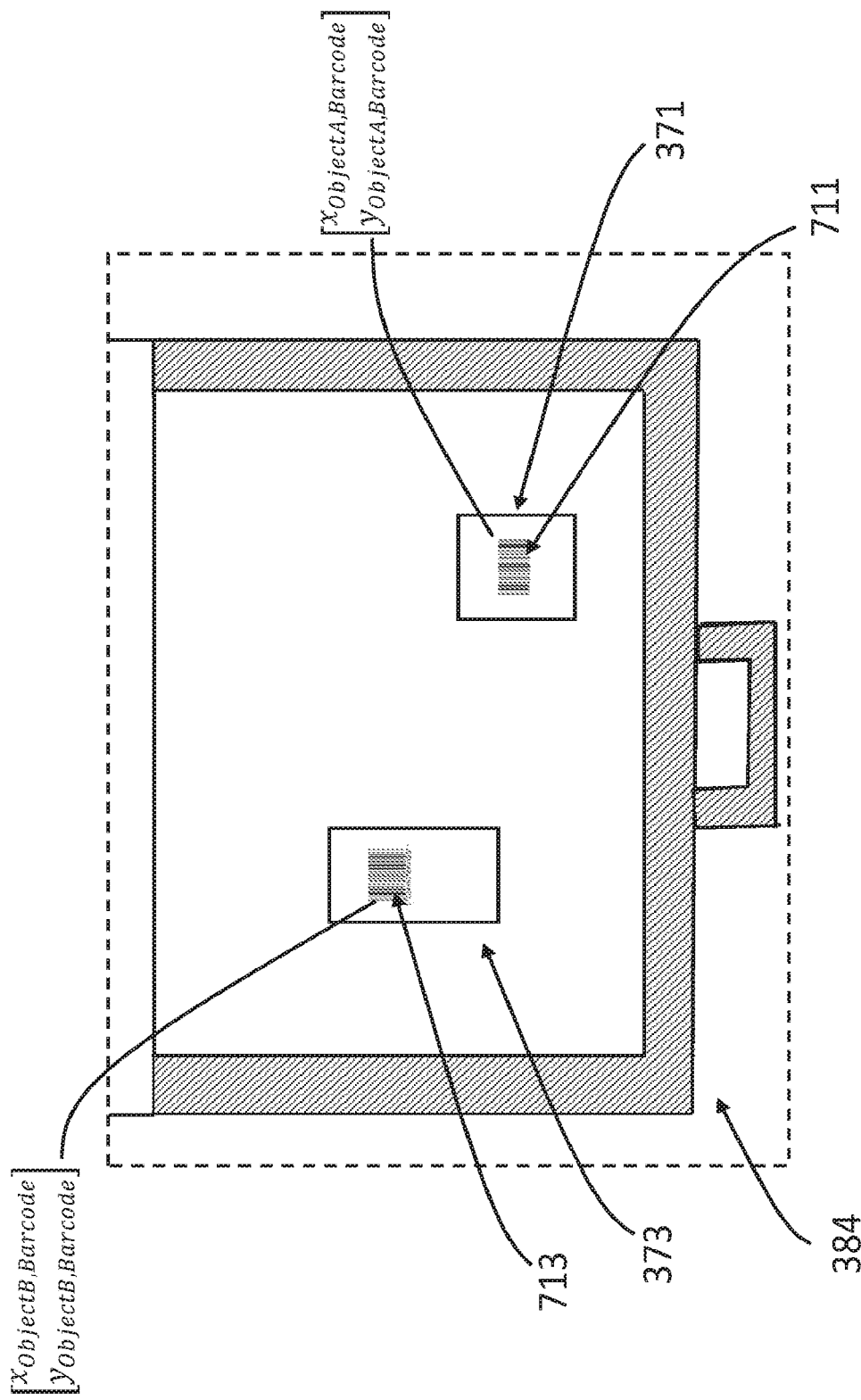
FIGS. 7B and 7C illustrate determining a barcode location being used to determine one or more object locations, according to an embodiment hereof.

In some cases, step 406 may be performed in an environment that includes an object identifier sensing device, such as the barcode sensing device 352 of FIG. 7A. The barcode sensing device 352 (which may be an embodiment of the object identifier sensing device 152) may be mounted to a robot arm (e.g., 363), or to a stationary mounting point. The barcode sensing device 352 may have a field of view 355 (also referred to as a reader field of view), and may be configured to sense a barcode or some other object identifier (if any) disposed on an object (e.g., 371/373) disposed within a container (e.g., 384A). For example, FIG. 7B provides an example in which a barcode 711 is disposed on the object 371, and a barcode 713 is disposed on the object 373. As stated above, an object identifier information may be configured to generate sensed object identifier information. In the example of FIG. 7B, the barcode sensing device 352 may be configured to generate sensed barcode information, which may describe a location of the barcode 711/713, information encoded into the barcode 711/713, or any other information about the barcode 711/713. The information encoded into the barcode 711/713 may describe an object 371/373 on which the barcode is disposed, such as an identity of the object 711/713 or a size of the object 711/713.

In some cases, the computing system 101 may be configured to determine whether information encoded into a barcode (e.g., 711/713) or other object identifier matches object identification information received by the computing system 101. For instance, the computing system 101 may receive object identification information, such as a stock keeping unit (SKU) number and/or universal product code (UPC), that identifies a particular item, such as merchandise, for retrieval by a robot (e.g., 361). In such an instance, the computing system 101 may be configured to determine whether any object in the container (e.g., 384A) has a barcode (e.g., 711/713) or other object identifier disposed thereon that matches the object identification information, or more specifically whether information encoded in the barcode (e.g., 711) or other object identifier matches the object identification information. If there is a barcode (e.g., 711) or other object identifier whose encoded information matches the object identification information, the computing system 101 may use the barcode to, e.g., determine a 2D component for one or more locations associated with the object (e.g., 371) on which the barcode (e.g., 711) or other object identifier is disposed.

In an embodiment, the computing system 101 may be configured to determine an object identifier location, such as a barcode location. The barcode location may describes a 2D location of a barcode (e.g., 711/713), such as a barcode which matches the object identification information. In some cases, the object identifier's 2D location may be represented by a 2D coordinate (also referred to as a 2D object identifier coordinate). If the object identifier is a barcode, the 2D object identifier coordinate may be a 2D barcode coordinate.

For example, the computing system 101 may be configured to determine a 2D barcode coordinate $[x_{BarcodeA}, y_{BarcodeA}]$ representing a location of the barcode 711 in FIG. 7B, and to determine a 2D barcode coordinate $[x_{BarcodeB}, y_{BarcodeB}]$ representing a location for the barcode 713. In some cases, the 2D barcode coordinate may be generated by the barcode sensing device 352 of FIG. 7A or by some other object identifier sensing device. As stated above, the barcode location may be determined for a barcode that matches the object identification information discussed above. For example, if the computing system 101 determines that information encoded in the barcode 711 on object 371 matches a received SKU number, the computing system 101 may determine a 2D barcode coordinate $[x_{objectA,barcode}, y_{objectA,barcode}]$ for a location of the barcode 711.

In an embodiment, the computing system 101 may use information encoded into a barcode (e.g., 711) or other object identifier to determine a size or other information regarding an object (e.g., 371) on which the barcode is disposed. For example, the barcode 711 or other object identifier may encode the height of the object 371 $h_{object}$ discussed above, a length or width of the object 371, or encode any other information regarding a size of the object 371 (also referred to as an object size). The height $h_{object}$ may be used to determine a depth value for a location on the object 371, as also discussed above.

In an embodiment, the computing system 101 may be configured to use the sensed object identifier information associated with an object identifier (e.g., sensed barcode information associated with barcode 711) to determine one or more 2D locations for an object (e.g., 371) on which the object identifier is disposed, or more specifically to determine one or more 2D coordinates for one or more respective locations on the object (e.g., 371). The 2D object coordinates may be combined with the depth values discussed above to plan robot interaction with the object (also referred to as 2D object coordinates). In some cases, the 2D object coordinates may approximate a contour of the object (e.g., 371), such as a 2D boundary of a top surface of the object.

In an embodiment, the 2D object coordinates for the object locations may be determined based on the spatial structure information. For instance, the spatial structure information may be a point cloud that represents a plurality of locations on one or more surfaces sensed from an environment in the camera field of view (e.g., 353). For instance, the locations represented by the point cloud may be those illustrated in FIGS. 6A-6C and 7C, such as the various sets 610-660 of locations on the container surface (e.g., 384A-1), a surface of objects (e.g., 371, 373), and a surface of a container rim (e.g., 384A-2). In such an embodiment, the computing system 101 may be configured to use sensed object identifier information, such as sensed barcode information, to search the point cloud to determine at least a set of one or more 2D object coordinates. The 2D object coordinates may be, e.g., [x y] coordinates that represent respective object locations. For instance, the 2D object coordinates may be respective 2D coordinates representing some or all of the object locations $650_1$ through $650_4$ on object 371 in FIG. 7C, or some or all of object locations $660_1$ through $660_5$ on object 373. The 2D object coordinates may be combined with corresponding depth values or an object's orientation to generate a movement command for interacting with the object (e.g., 371/373), as discussed below in more detail.

In an embodiment, the 2D object coordinates for the object locations may be determined based on the spatial structure information and based on an object identifier's location, or more specifically its 2D object identifier coordinate. If the object identifier is a barcode, the 2D object coordinates may be determined based on the spatial structure information and the barcode's location. More specifically, the barcode's location (e.g., 2D barcode coordinate) may be used to narrow down which portion of the spatial structure information in which to search for the 2D object coordinates. More specifically, the search may be limited to a portion of the spatial structure information corresponding to a region surrounding the object identifier's location, or more specifically the barcode's location. For instance, to search for 2D locations on the object 371, the computing system 101 may determine a region 721 of FIG. 7C which surrounds a barcode location for the barcode 711 of FIG. 7B. That is, the region 721 surrounds the 2D barcode coordinate $[x_{objectA,Barcode}, y_{objectA,Barcode}]$. In some cases, the region 721 may be a 2D region or a 3D region.

In an embodiment, the computing system 101 may be configured to search a portion of the spatial structure information corresponding to the region 721 to identify object locations corresponding to the object 711, or more specifically to search for locations falling on the object 711. Thus, rather than search through all locations represented by the spatial structure information depicted in FIG. 7C, the computing system 101 may search a subset of those locations represented by the spatial structure information. More particularly, the subset of locations may be those in the region 721. The computing system 101 may be configured to search for locations on the object 371 by, e.g., identifying locations that have a sufficiently sharp difference in depth from surrounding locations that are on the container surface 384A-1. In some instances, the computing system 101 may determine 2D object coordinates for locations on the object. For example, if the spatial structure information provides a [x y z] coordinate for location $650_1$, which falls on the object 371, the computing system 101 may determine [x y] as a 2D object coordinate for that object location. Although the spatial structure information in this example may also provide a z-component for that location, the z-component may be unreliable because of noise, as discussed above. More specifically, the z-component may have sufficient accuracy for the computing system 101 to distinguish between locations on the object 371 and locations on a surrounding container surface 384A-1, but may lack sufficient accuracy to plan robot interaction with the object 371. Thus, as further discussed above, the computing system 101 may use the container pose to determine a respective depth value for the object location $650_1$, or more generally for an object location having the 2D object coordinate or 2D component [x y]. In some instances, the 2D object coordinate for, e.g., object location $650_1$ and the corresponding depth value for that location may be combined to form a more trustworthy 3D coordinate for that object location.

Figure 7C:
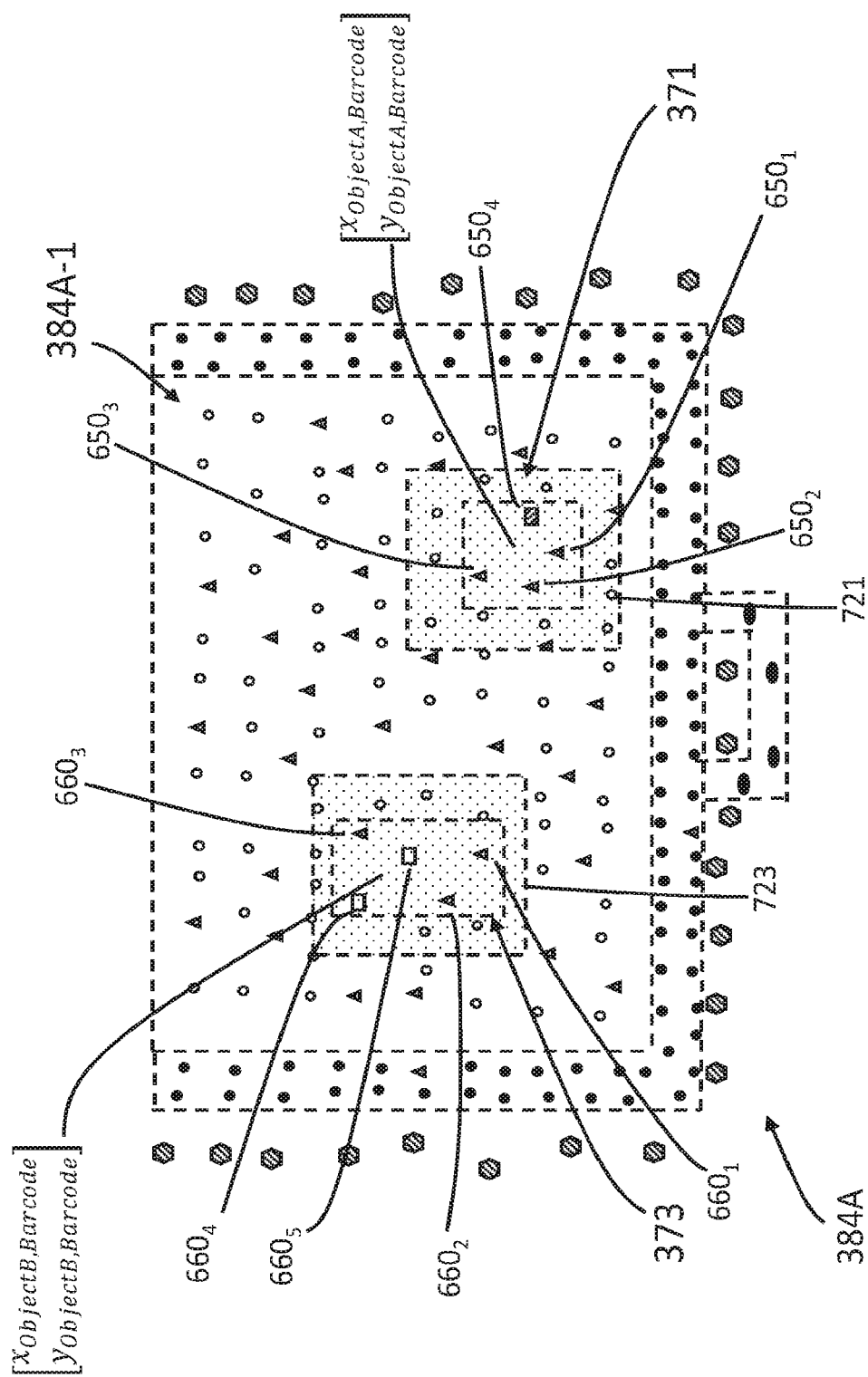

FIG. 7C further depicts a region 723 which surrounds a 2D object identifier coordinate, or more specifically the 2D barcode coordinate $[x_{objectB,Barcode}, y_{objectB,Barcode}]$ for the barcode 713. The computing system 101 may be configured to search the region 723 to determine object locations for the object 373. In an embodiment, the region 721/723 may have a defined fixed size. In an embodiment, the region 721/723 may have a size that is based on an object size of the object 371/373.

In an embodiment, the object locations for an object (e.g., 371) may be determined based on its object size, which may be, e.g., encoded into a barcode (e.g., 711) or other object identifier disposed on the object. For instance, the object size may indicate a length and width of the object (e.g., 371). The computing system 101 may be configured to estimate 2D coordinates representing, e.g., an edge or other boundary of the object (e.g., 371) based on the object size. As an example, the computing system 101 may estimate, based on the length or width of the object, that a particular edge of the object is a certain distance away from the barcode location or other object identifier location. The computing system 101 may use that distance to determine a 2D coordinate which indicates where that particular edge is located.

In an embodiment, a 2D object identifier coordinate, such as the 2D barcode coordinate for the barcode location, may be determined based on information sensed by the object identifier sensing device (e.g., barcode sensing device 352 of FIG. 7A). For instance, the barcode sensing device (e.g., 352) may generate a [x y] coordinate as the 2D barcode coordinate, and communicate the [x y] coordinate to the computing system 101. The computing system 101 may be configured, if necessary, to convert the [x y] coordinate from being expressed in a coordinate system of the object identifier sensing device (e.g., barcode sensing device 352) to being expressed in another coordinate system, such as that of the spatial structure sensing camera (e.g., 351). As stated above, the object identifier sensing device (e.g., barcode sensing device 352) may in some instances include a 2D camera (e.g., 153 of FIG. 1E). In such instances, the object identifier sensing device (e.g., barcode sensing device 352) may be configured to capture a 2D image. For instance, FIG. 7B may represent a 2D image representing a field of view (e.g., 355) of the barcode sensing device 352. The object identifier sensing device (e.g., barcode sensing device 352) and/or the computing system 101 may be configured to detect a barcode (e.g., 711/713) or other object identifier from the 2D image and to determine the 2D object identifier coordinate based on where the object identifier (e.g., barcode 711/713) appears in the 2D image.

In an embodiment, if a 2D image is generated, it may be used to determine the 2D object coordinates. For example, if the computing system 101 receives the 2D image, it may be configured to detect an edge or other boundary of an object (e.g., 371) appearing the in the 2D image, and to determine a 2D object coordinate representing the object based on where the edge appears in the 2D image. In some cases, the computing system 101 may be configured to limit its search for the edge or other boundary to only a portion of the 2D image. In such cases, the portion of the 2D image in which the search is performed may be based on an object identifier location, such as a barcode location for a barcode (e.g., 711) disposed on the object, or on where the barcode appears in the 2D image.

Figure 8:
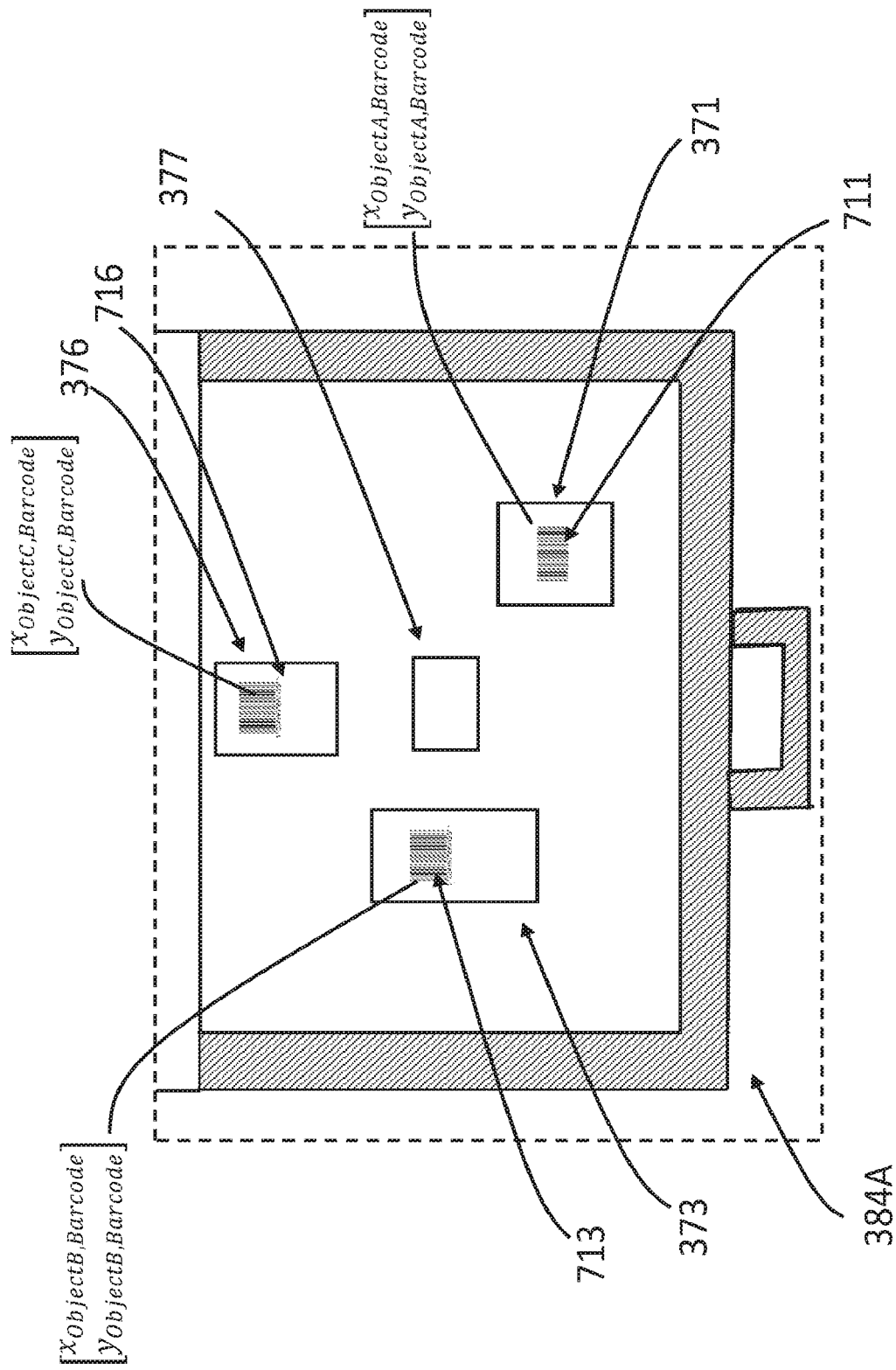
FIG. 8 illustrates barcodes which are adjacent to an object being used to determine a location for the object, according to an embodiment hereof.

In an embodiment, the computing system 101 may be configured to estimate a 2D location for an object based on object identifier locations, such as barcode locations of adjacent barcodes. The adjacent barcodes are not disposed on the object, and may be disposed on adjacent objects. For example, FIG. 8 illustrates a scenario in which an object 377 is disposed within the container 384A, and has no barcode disposed thereon. In this example, the computing system 101 may be configured to use 2D barcode locations of barcodes 711, 713, 716, which are disposed on adjacent objects 371, 373, 376, respectively, to triangulate or otherwise determine a 2D location for the object 377. For instance, the computing system 101 may be configured to determine a region whose boundary is defined by 2D barcode coordinates [$x_{objectA,Barcode}$, $y_{objectA,Barcode}$], [$x_{objectB,Barcode}$, $y_{objectB,Barcode}$], [$x_{objectC,Barcode}$, $y_{objectC,Barcode}$] for the barcodes 711, 713, 716, respectively, and to search that region for the object 377. More particularly, the computing system 101 may search a portion of the spatial structure information corresponding to that region, for locations which fall on object 377.

In an embodiment, if the barcode sensing device (or some other object identifier sensing device) and/or the spatial structure sensing camera is attached to a robot arm (e.g., 353 of FIG. 3A), the computing system 101 may be configured to control placement of the device/camera (e.g., 352/351) by causing movement of the robot arm. For instance, the computing system 101 may be configured to generate and output a sensor movement command for causing the robot arm 363 to move the object identifier sensing device (e.g., barcode sensing device 352) and/or the spatial structure sensing camera (e.g., 351) to a desired location and/or orientation. The sensor movement command may, e.g., cause the devices (e.g., 352/351) to be moved to a location that is within a defined level of proximity. In some cases, the defined level of proximity may be based on a focal distance of the object identifier sensing device. More particularly, the sensor movement command may cause the object identifier sensing device to be moved sufficiently close to objects in the container (e.g., 354A) such that any barcode (e.g., 711) on the objects will be within the focal distance of the object identifier sensing device. In an embodiment, the spatial structure information received in step 402 and the sensed barcode information or other object identifier information may be generated after the devices (e.g., 352/351) have been moved as a result of the sensor movement command.

Figure 9:
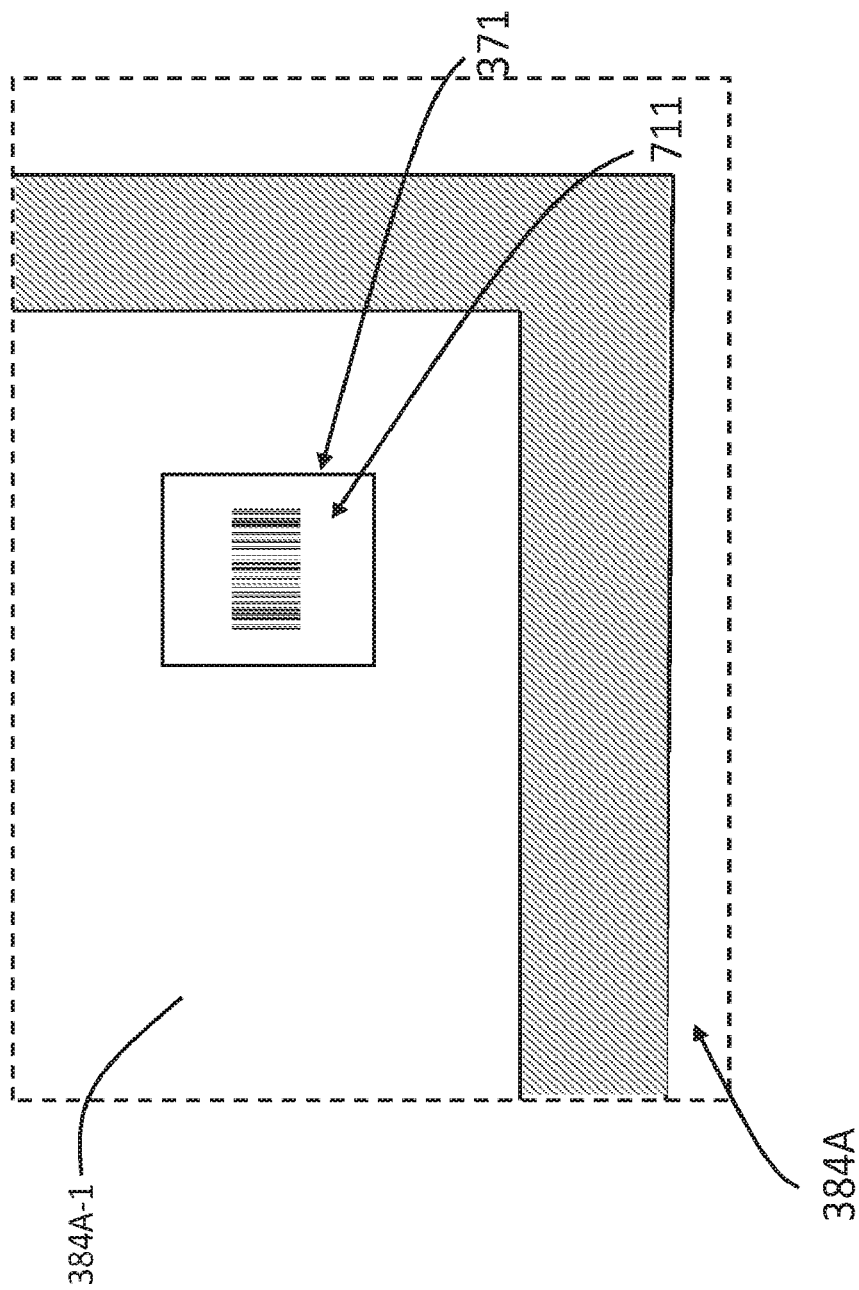
FIG. 9 illustrates spatial structure information and/or sensed object identifier information, or more specifically sensed barcode information, which covers only a portion of a container, according to an embodiment hereof.

In an embodiment, the sensor movement command may cause the spatial structure information and/or the barcode sensing device (or any other object identifier sensing device) to be moved within a range of proximity such that the spatial structure information and/or sensed barcode information represents or covers only a portion of the container surface (e.g., 384A-1). For example, FIG. 9 illustrates a situation in which only a portion of the container surface (e.g, 384A-1), or more generally of one side of the container (e.g., 384A) is captured by the spatial structure sensing camera 351 and/or the barcode sensing device 352. That is, only a portion of the container surface (e.g., 384A-1) may be in the camera field of view (e.g., 353) or reader field of view (e.g., 355) at such level of proximity. It may not be necessary to capture information for an entirety of the container surface (e.g., 384A-1) or an entirety of the container (e.g., 384A). Rather, capturing only a portion of the container (e.g., 384A) may allow the computing system 101 to focus on a particular portion of the container (e.g., 384), such as its right half, and more specifically to focus on detecting objects in that portion. In some cases, the computing system 101 may limit how many times the spatial structure sensing camera (e.g., 351) and/or object identifier sensing device (e.g., barcode sensing device 352) is moved or how many locations the camera/device (e.g., 351/352) are moved to for capturing information about a particular container (e.g., 384A). For instance, the camera/device (e.g., 351/352) may be moved only once, to a single location, for capturing a snapshot of a particular container.

Figure 10:
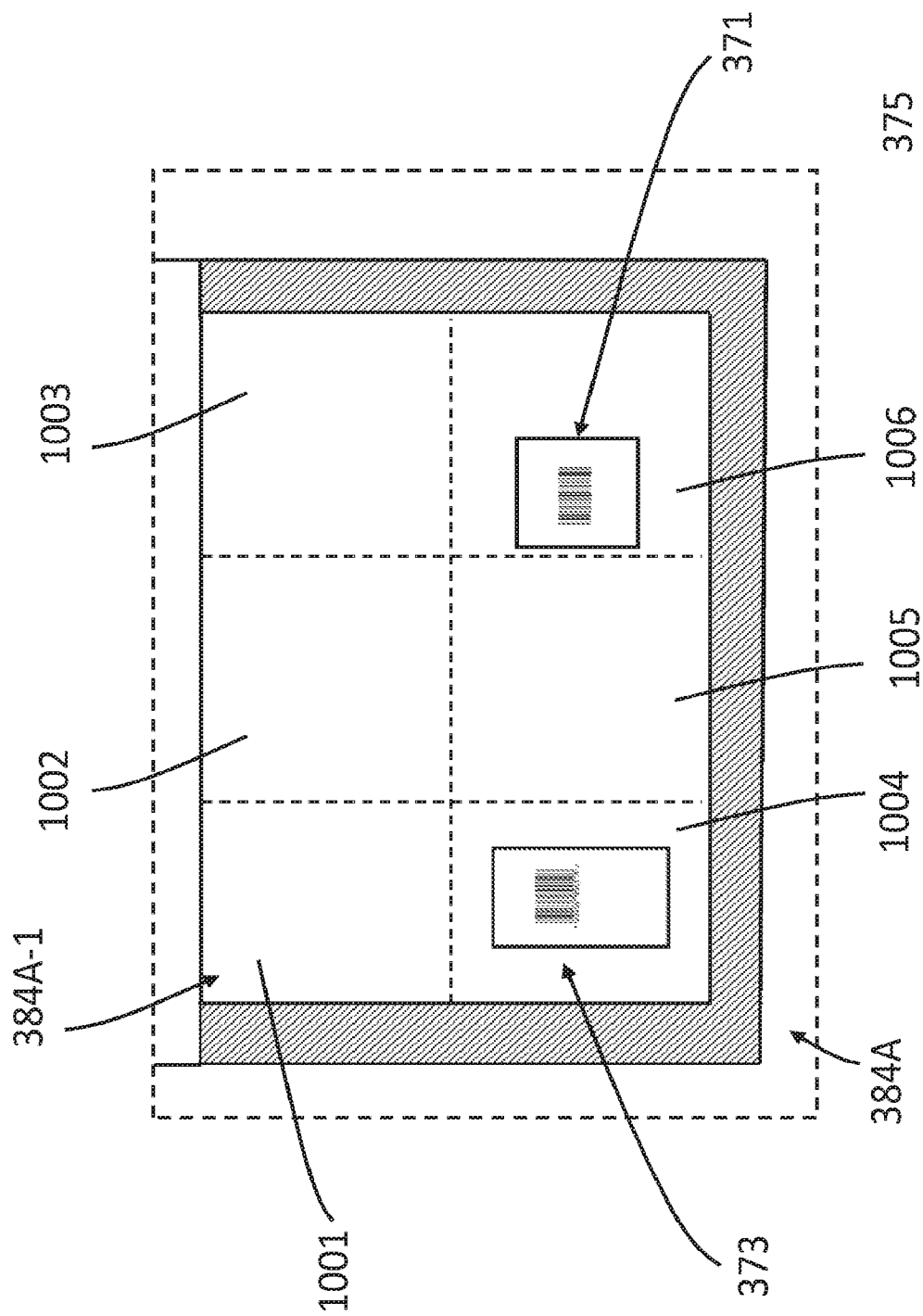
FIG. 10 illustrates segmentation which associates different regions of the container with different segments, according to an embodiment hereof.

In an embodiment, the computing system 101 may be configured to perform segmentation of a particular container (e.g., 384A) by associating different regions on the container surface (e.g., 384A-1) with different segments. For instance, FIG. 10 depicts a situation in which the container surface 384A-1 may be virtually divided into segments 1001 through 1006. In this scenario, the computing system 101 may be configured receive a container segment identifier associated with an object. In one example, the computing system 101 may receive a container segment identifier that identifies segment 1006, or that more specifically indicates robot interaction is desired for an object (e.g., 371) disposed within segment 1006. In an embodiment, the computing system 101 may be configured to determine locations on the container surface (e.g., 384A-1) associated with the container segment identifier. In some cases, determining those locations may include determining their depth values, which may involve using at least one of the container rim pose or the container surface pose, as discussed above.

In an embodiment, the method 400 may include a step 408, in which the computing system 101 outputs a movement command for causing robot interaction with the object (e.g., 371/373), such as the robot arm (e.g., 363) grasping or otherwise picking up the object. Such a movement command may also be referred to as an object movement command. In some cases, step 408 may be performed by the motion planning module 206 of FIG. 2C, which may be configured to, e.g., generate object movement commands, the sensor movement commands discussed above, and container movement commands (which are discussed below). The object movement command may be generated by the computing system 101 based on, e.g., the object pose determined in step 406, such as the orientation or depth value for the object (e.g., 371). For instance, the object movement command may be determined so as to cause a robot hand or other end effector on the robot arm (e.g., 363) to be moved to be within range for manipulating or otherwise interacting with the object (e.g., 371), and to an orientation that matches an orientation for the object (e.g., 371). In an embodiment, the movement command may cause, e.g., rotation or other actuation that places the end effector at such a location and/or orientation. In some cases, the movement command may be generated based on the 2D object coordinates discussed above and their corresponding depth values, which may be provided by the object pose. For example, the object movement command may be generated so as to cause the end effector to approach the 2D object coordinates to a defined level of proximity which allows the end effector to manipulate or otherwise interact with the object (e.g., 371).

In an embodiment, the object movement command may be determined so as to avoid a collision event. The collision event may represent a collision between an object being moved (e.g., 371) and, e.g., a container sidewall (e.g., 384A-5 of FIG. 3D) or other container boundary forming the container rim (e.g., 384A-2). In some cases, the computing system 101 may be configured to determine an object movement path that avoids such a collision event. The object movement path may be a movement path for the object (e.g., 371) being moved. The object movement command may be generated based on the object movement path. In some cases, the accurate determination of the object pose in step 406 may facilitate such collision avoidance.

As discussed above, the method 400 may in some embodiments begin in a scenario in which the container (e.g., 384A) is already in an opened position, such as that illustrated in FIG. 3C. In an embodiment, the method 400 may begin in a scenario in which the container (e.g., 384A) is in a closed position, such as that illustrated in FIG. 3A and FIG. 11A. In such an embodiment, the method 400 may include a step in which the computing system 101 controls the robot arm (e.g., 363) to move the container (e.g., 384A) to an opened position. Such a container opening step may occur before spatial structure information is received in step 402.

Figures 11A, 11B:
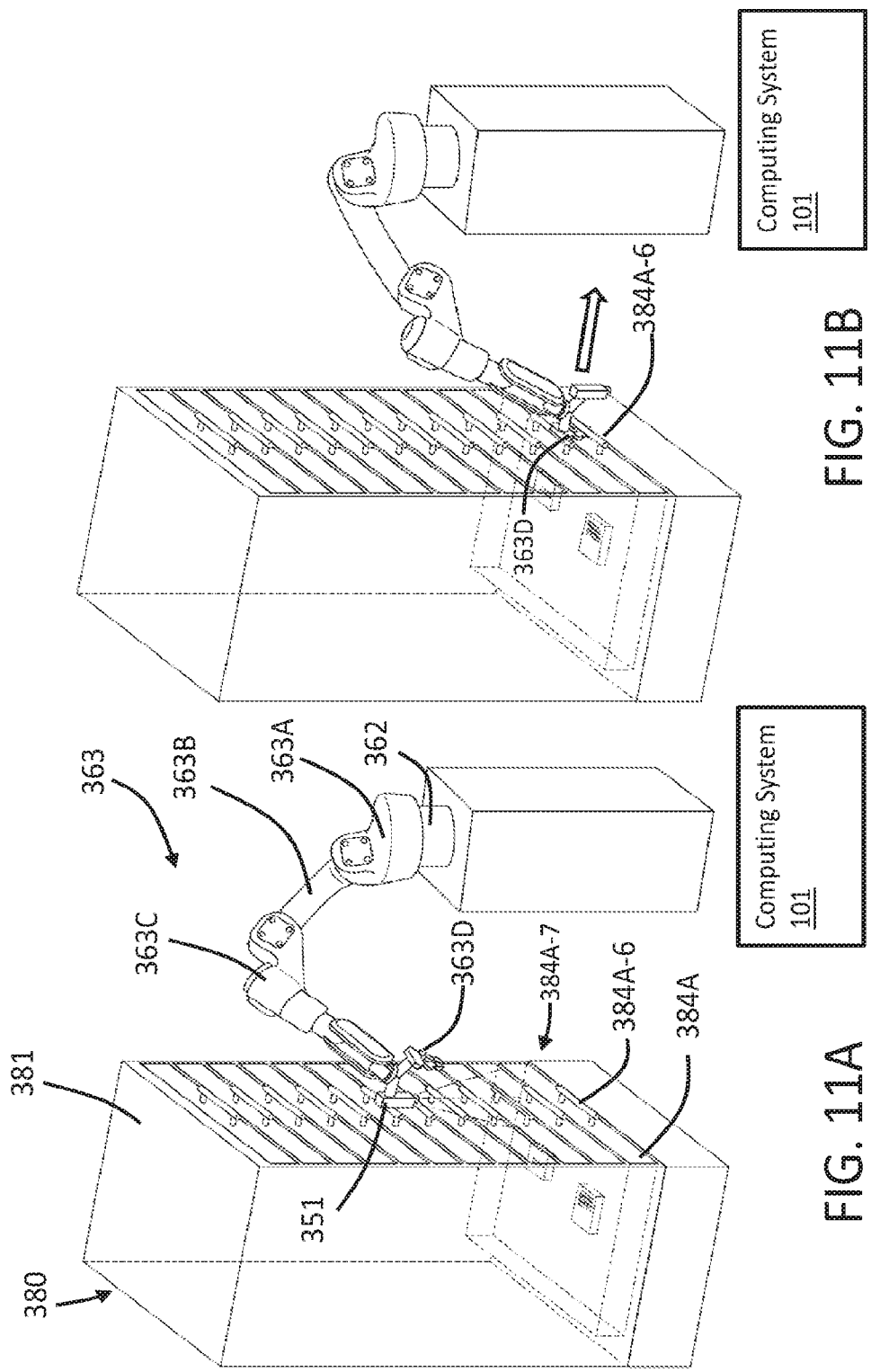
FIGS. 11A-11C illustrate a container being moved from being in a closed position to being in an opened position, according to an embodiment hereof.
Figure 11C:
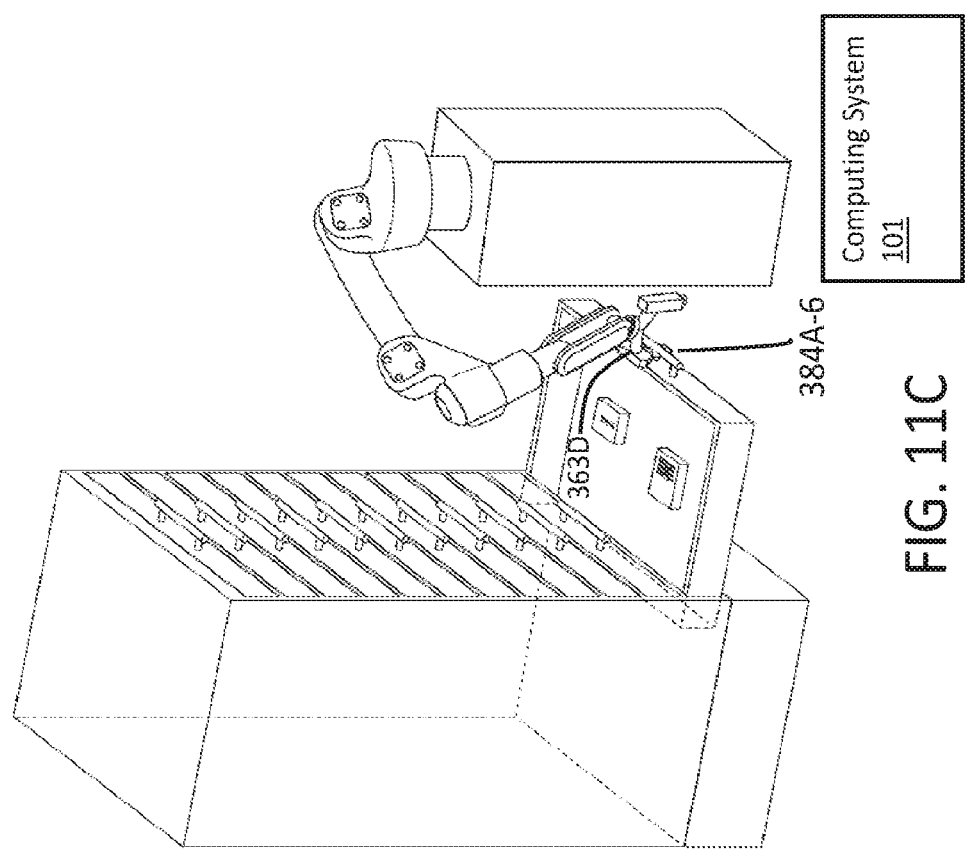

For example, FIGS. 11A and 11B depict a situation in which the container 384A is in a closed position. In such a situation, the spatial structure sensing camera 351 may be configured to generate spatial structure information that describes an exterior surface 384A-7 of the container 384A, or more specifically describes locations on the exterior surface 384A-7. The spatial structure information in this example may be different from the spatial structure information of step 402, which involves an opened container situation. The computing system 101 may be configured to determine one or more locations representing the handle 384A-6 of the container 384A based on the spatial structure information describing the exterior surface 384A-7. Further, the computing system 101 may be configured to generate and output a container movement command for causing the robot arm 363 to move the container 384A from the closed position to the opened position. The container movement command may be generated based on the one or more locations representing the handle 384A-6 (also referred to as container handle positions). More particularly, as illustrated in FIGS. 11B and 11C, the container movement command may cause the robot hand 363D or other end effector of the robot arm 363 to pull on the handle 384A-6 so as to slide the container 384A to the opened position. After the container 384A is in the opened position, the spatial structure sensing camera 351 may in some scenarios be moved to another location (e.g., via a sensor movement command) to capture spatial structure information regarding a container surface and objects disposed thereon, after which an object pose may be determined, and an object may be moved (e.g., via an object movement command) based on the object pose.

Additional discussion of various embodiments:

Embodiment 1 relates to a computing system comprising a communication interface and at least one processing circuit. The communication interface is configured to communicate with a robot having a robot arm that has a spatial structure sensing camera disposed on the robot arm, wherein the spatial structure sensing camera has a camera field of view. The at least one processing circuit is configured to perform the following method when an object within a container is or has been in the camera field of view while the container is in an opened position: receiving spatial structure information that includes depth information for an environment in the camera field of view, wherein the spatial structure information is generated by the spatial structure sensing camera; determining a container pose based on the spatial structure information, wherein the container pose is for describing at least one of an orientation for the container or a depth value for at least a portion of the container; determining an object pose based on the container pose, wherein the object pose is for describing at least one of an orientation for the object or a depth value for at least a portion of the object; outputting a movement command for causing robot interaction with the object, wherein the movement command is generated based on the object pose.

Embodiment 2 includes the computing system of embodiment 1. In this embodiment, the at least one processing circuit is configured to determine the container pose as a container surface pose for describing at least one of: an orientation for a container surface on which the object is disposed or a depth value for at least one location on the container surface.

Embodiment 3 includes the computing system of embodiment 2, wherein the at least one processing circuit is configured, when the container is a drawer having a container rim that is offset from the container surface, to determine a container rim pose for describing at least one of: an orientation for the container rim or a depth value for at least one location on the container rim, wherein the container rim pose is determined based on the spatial structure information. Further, the container surface pose is determined based on the container rim pose and based on a defined distance between the container rim and the container surface.

Embodiment 4 includes the computing system of embodiment 2 or 3. In this embodiment, the at least one processing circuit is configured to: receive a container segment identifier associated with the object, wherein the container segment identifier is for identifying a segment of the container surface, and determine locations associated with the container segment identifier, wherein the determining is based on the container surface pose.

Embodiment 5 includes the computing system of embodiment 3 or 4. In this embodiment, the at least one processing circuit is configured to determine an object movement path which avoids a collision event, wherein the collision event represents collision between the object and a container boundary forming the container rim, and wherein the movement command is generated based on the object movement path.

Embodiment 6 includes the computing system of any one of embodiments 1-5. In this embodiment, the at least one processing circuit is configured, when an object identifier is disposed on the object, to: determine an object identifier location for describing a 2D location of the object identifier; and determine a set of one or more object locations, which are one or more locations representing the object, based on the object identifier location and the spatial structure information, wherein the movement command is generated based on the set of one or more object locations.

Embodiment 7 includes the computing system of embodiment 6. In this embodiment, the at least one processing circuit is configured to determine a region which surrounds the object identifier location, and to determine the set of one or more object locations by searching a portion of the spatial structure information corresponding to the determined region surrounding the object identifier location.

Embodiment 8 includes the computing system of embodiment 7. In this embodiment, the spatial structure information includes a point cloud that represents a plurality of locations on one or more surfaces sensed from the environment in the camera field of view, wherein the portion of the spatial structure information from which the set of one or more object locations are searched includes a subset of the plurality of locations that are located within the determined region surrounding the object identifier location.

Embodiment 9 includes the computing system of any one of embodiments 6-8. In this embodiment, the at least one processing circuit is configured to: determine at least a 2D object identifier coordinate, which is a 2D coordinate for representing the object identifier's location, and determine at least a set of one or more 2D object coordinates based on the 2D object identifier coordinate, wherein the one or more 2D object coordinates are one or more respective 2D coordinates for representing the one or more object locations, wherein the movement command is generated based on the set of one or more 2D object coordinates and based on an orientation and depth value for the object.

Embodiment 10 includes the computing system of any one of embodiments 6-9. In this embodiment, the at least one processing circuit is configured to determine an object size based on information encoded in the object identifier, wherein the one or more object locations represent a boundary for the object and are determined based on the object size.

Embodiment 11 includes the computing system of any one of embodiments 6-10. In this embodiment, the at least one processing circuit is configured to receive object identification information associated with the object, and to determine whether information encoded in the object identifier matches the object identification information.

Embodiment 12 includes the computing system of any one of embodiments 6-11. In this embodiment, when an object identifier sensing device is disposed on the robot arm, the at least one processing circuit is configured to determine the object identifier location based on information sensed by the object identifier sensing device.

Embodiment 13 includes the computing system of embodiment 12. In this embodiment, the movement command is an object movement command for causing the robot to move the object, wherein the at least one processing circuit is configured to output a sensor movement command for causing the robot arm to move the object identifier sensing device to be within a defined level of proximity to the container, and wherein the object identifier location is determined after outputting the sensor movement command.

Embodiment 14 includes the computing system of embodiment 13. In this embodiment, the sensor movement command is also for causing the robot arm to move the spatial structure sensing camera to be within the defined level of proximity to the container, wherein the spatial structure information is generated when the spatial structure sensing camera is within the defined level of proximity to the container, and represents a portion of a container surface on which the object is disposed.

Embodiment 15 includes the computing system of embodiment 13 or 14. In this embodiment, the at least one processing circuit is configured, when the container is in a closed position and includes a handle, to: receive additional spatial structure information for describing locations on an exterior surface for the container, determine, based on the additional spatial structure information, one or more handle locations for representing the handle, and output a container movement command for causing the robot arm to move the container from the closed position to the opened position, wherein the container movement command is generated based on the one or more handle locations, and wherein the sensor movement command and the object movement command are outputted after the container movement command.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:

1. A computing system comprising:
 a communication interface configured to communicate with a robot having a robot arm that has a spatial structure sensing camera disposed on the robot arm, wherein the spatial structure sensing camera has a camera field of view; and
 at least one processing circuit configured to perform the following when a drawer is in a closed position:
 determining a location representing a handle of the drawer;
 outputting a container movement command for causing the robot arm to move the drawer from the closed position to an open position;
 moving the spatial structure sensing camera to another location to capture spatial structure information;
 determining a drawer pose based on the spatial structure information;
 determining an object pose of an object located within the drawer based on the drawer pose; and
 outputting a movement command for causing robot interaction with the object, wherein the movement command is generated based on the object pose.

2. The computing system of claim 1, wherein the at least one processing circuit is configured to determine the drawer pose as a drawer surface pose for describing at least one of: an orientation for a drawer surface on which the object is disposed or a depth value for at least one location on the drawer surface.

3. The computing system of claim 2, wherein the at least one processing circuit is configured, when the drawer has a drawer rim that is offset from the drawer surface, to determine a drawer rim pose for describing at least one of: an orientation for the drawer rim or a depth value for at least one location on the drawer rim,
 wherein the drawer rim pose is determined based on the spatial structure information, and
 wherein the drawer surface pose is determined based on the drawer rim pose and based on a defined distance between the drawer rim and the drawer surface.

4. The computing system of claim 3, wherein the at least one processing circuit is configured to:
 receive a drawer segment identifier associated with the object, wherein the drawer segment identifier is for identifying a segment of the drawer surface, and
 determine locations associated with the drawer segment identifier, wherein the determining is based on the drawer surface pose.

5. The computing system of claim 3, wherein the at least one processing circuit is configured to determine an object movement path which avoids a collision event, wherein the collision event represents collision between the object and a drawer boundary forming the drawer rim, and wherein the movement command is generated based on the object movement path.

6. The computing system of claim 1, wherein the at least one processing circuit is configured, when an object identifier is disposed on the object, to:
 determine an object identifier location for describing a 2D location of the object identifier; and
 determine a set of one or more object locations, which are one or more locations representing the object, based on the object identifier location and the spatial structure information,
 wherein the movement command is generated based on the set of one or more object locations.

7. The computing system of claim 6, wherein the at least one processing circuit is configured to determine a region which surrounds the object identifier location, and to determine the set of one or more object locations by searching a portion of the spatial structure information corresponding to the determined region surrounding the object identifier location.

8. The computing system of claim 7, wherein the spatial structure information includes a point cloud that represents a plurality of locations on one or more surfaces sensed from an environment in the camera field of view, wherein the portion of the spatial structure information from which the set of one or more object locations are searched includes a subset of the plurality of locations that are located within the determined region surrounding the object identifier location.

9. The computing system of claim 6, wherein the at least one processing circuit is configured to:
 determine at least a 2D object identifier coordinate, which is a 2D coordinate for representing the object identifier location, and
 determine at least a set of one or more 2D object coordinates based on the 2D object identifier coordinate, wherein the set of one or more 2D object coordinates are one or more respective 2D coordinates for representing the set of one or more object locations, wherein the movement command is generated based on the set of one or more 2D object coordinates and based on an orientation of the object and depth value for the object.

10. The computing system of claim 6, wherein the at least one processing circuit is configured to determine an object size based on information encoded in the object identifier, wherein the set of one or more object locations represent a boundary for the object and are determined based on the object size.

11. The computing system of claim 6, wherein the at least one processing circuit is configured to receive object identification information associated with the object, and to determine whether information encoded in the object identifier matches the object identification information.

12. The computing system of claim 6, wherein, when an object identifier sensing device is disposed on the robot arm, the at least one processing circuit is configured to determine the object identifier location based on information sensed by the object identifier sensing device.

13. The computing system of claim 12, wherein the movement command is an object movement command for causing the robot to move the object,
 wherein the at least one processing circuit is configured to output a sensor movement command for causing the robot arm to move the object identifier sensing device to be within a defined level of proximity to the drawer, wherein the object identifier location is determined after outputting the sensor movement command.

14. The computing system of claim 13, wherein the sensor movement command is also for causing the robot arm to move the spatial structure sensing camera to be within the defined level of proximity to the drawer,
 wherein the spatial structure information is generated when the spatial structure sensing camera is within the defined level of proximity to the drawer, and represents a portion of a drawer surface on which the object is disposed.

15. The computing system of claim 13, wherein the at least one processing circuit is configured, when the drawer is in the closed position, to:

receive additional spatial structure information for describing locations on an exterior surface for the drawer, and determine, based on the additional spatial structure information, the location representing the handle of the drawer, wherein the drawer movement command is generated based on the location representing the handle of the drawer, and wherein the sensor movement command and the object movement command are outputted after the drawer movement command.

16. A non-transitory computer-readable medium having instructions that, when executed by at least one processing circuit of a computing system, wherein the computing system is configured to communicate with a robot having a robot arm that has a spatial structure sensing camera with a camera field of view disposed on the robot arm, causes the at least one processing circuit to, when a drawer is in a closed position:

determine a location representing a handle of the drawer;

output a container movement command for causing the robot arm to move the drawer from the closed position to an open position;

move the spatial structure sensing camera to another location to capture spatial structure information;

receive the spatial structure information;

determine a drawer pose based on the spatial structure information;

determine an object pose of an object located within the drawer based on the drawer pose; and output a movement command for causing robot interaction with the object, wherein the movement command is generated based on the object pose.

17. The non-transitory computer-readable medium of claim 16, wherein the instructions, when executed by the at least one processing circuit, causes the at least one processing circuit to determine the drawer pose as a drawer surface pose for describing at least one of: an orientation for a drawer surface on which the object is disposed or a depth value for at least one location on the drawer surface.

18. The non-transitory computer-readable medium of claim 17, wherein the instructions, when executed by the at least one processing circuit, and when the drawer has a drawer rim that is offset from the drawer surface, causes the at least one processing circuit to determine a drawer rim pose for describing at least one of: an orientation for the drawer rim or a depth value for at least one location on the drawer rim, wherein the drawer rim pose is determined based on the spatial structure information, and wherein the drawer surface pose is determined based on the drawer rim pose and based on a defined distance between the drawer rim and the drawer surface.

19. A method for object detection, comprising:

receiving, by a processing circuit of a computing system, spatial structure information, wherein the computing system is configured to communicate with a robot having a robot arm that has a spatial structure sensing camera disposed on the robot arm and having a camera field of view, when a drawer is in a closed position;

determining a location representing a handle of the drawer;

outputting a container movement command for causing the robot arm to move the drawer from the closed position to an open position;

moving the spatial structure sensing camera to another location to capture spatial structure information;

determining a drawer pose based on the spatial structure information;

determining an object pose of an object located within the drawer based on the drawer pose; and outputting a movement command for causing robot interaction with the object, wherein the movement command is generated based on the object pose.

20. The method of claim 19, wherein determining the drawer pose includes determining a drawer surface pose for describing at least one of: an orientation for a drawer surface on which the object is disposed or a depth value for at least one location on the drawer surface.

* * * * *